(12) United States Patent
Ton-That et al.

(10) Patent No.: US 11,816,975 B2
(45) Date of Patent: *Nov. 14, 2023

(54) WILDFIRE DEFENDER

(71) Applicant: The Travelers Indemnity Company, Hartford, CT (US)

(72) Inventors: Hoa Ton-That, Glastonbury, CT (US); James Dykstra, Manchester, CT (US); John Han, Glastonbury, CT (US); Stefanie M. Walker, Meriden, CT (US); Joseph Amuso, Stafford, CT (US); George Lee, North Franklin, CT (US); Kyle J. Kelsey, Portland, CT (US)

(73) Assignee: THE TRAVELERS INDEMNITY COMPANY, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/700,652

(22) Filed: Mar. 22, 2022

(65) Prior Publication Data

US 2022/0215744 A1  Jul. 7, 2022

Related U.S. Application Data

(63) Continuation-in-part of application No. 17/192,120, filed on Mar. 4, 2021, now Pat. No. 11,288,953, (Continued)

(51) Int. Cl.
*G08B 31/00* (2006.01)
*G06F 16/29* (2019.01)
(Continued)

(52) U.S. Cl.
CPC ............ *G08B 31/00* (2013.01); *A01G 23/00* (2013.01); *G06F 16/29* (2019.01); *G06F 16/587* (2019.01);
(Continued)

(58) Field of Classification Search
CPC ......... A01G 23/00; G06T 7/50; G06T 7/0002; G06T 2207/10032; G06T 2207/30184;
(Continued)

(56) References Cited

U.S. PATENT DOCUMENTS 10,311,302 B2  6/2019  Kottensteete et al.
10,366,288 B1  7/2019  Kottensteete et al.
(Continued)

*Primary Examiner* — Phi Hoang
(74) *Attorney, Agent, or Firm* — CANTOR COLBURN LLP

(57) ABSTRACT

A system includes a processing device and memory device storing instructions that result in accessing a first dataset including aerial imagery data and infrared data, accessing a second dataset including property boundary data, and identifying property boundaries associated with a geographic area. A plurality of models is applied to the datasets to identify and compute information of interest. Based on the first dataset and constrained by the property boundaries, a building detection model can be applied to identify a building, and a vegetation detection model can be applied to identify one or more areas of vegetation. An estimated distance can be determined between each of the areas of vegetation and the building as separation data, which can be compared to a defensible space guideline to determine a defensible space adherence score. A wildfire risk map can be generated, including the defensible space adherence score associated with the geographic area.

20 Claims, 18 Drawing Sheets

Related U.S. Application Data which is a continuation of application No. 16/585,565, filed on Sep. 27, 2019, now Pat. No. 10,964,201.

(51) Int. Cl.

| | |
|---|---|
| *G06T 7/00* | (2017.01) |
| *G06T 7/73* | (2017.01) |
| *G06T 7/50* | (2017.01) |
| *G06T 17/05* | (2011.01) |
| *G08B 17/00* | (2006.01) |
| *G08B 17/12* | (2006.01) |
| *A01G 23/00* | (2006.01) |
| *G06F 16/587* | (2019.01) |
| *G06V 20/10* | (2022.01) |
| *G06F 18/25* | (2023.01) |

(52) U.S. Cl.
CPC ............ *G06F 18/25* (2023.01); *G06T 7/0002* (2013.01); *G06T 7/50* (2017.01); *G06T 7/75* (2017.01); *G06T 17/05* (2013.01); *G06V 20/176* (2022.01); *G06V 20/188* (2022.01); *G08B 17/005* (2013.01); *G08B 17/12* (2013.01); *G06T 2207/10032* (2013.01); *G06T 2207/10048* (2013.01); *G06T 2207/30184* (2013.01); *G06T 2207/30188* (2013.01)

(58) Field of Classification Search
CPC . G06T 2207/30188; G06T 7/75; G06T 17/05; G06T 2207/10048; G08B 31/00; G08B 17/005; G08B 17/12; G08B 17/125; G06F 18/25; G06F 16/587; G06F 16/29; G06V 20/176; G06V 20/188; G06V 10/82; G06V 20/10; G06V 20/17

See application file for complete search history.

(56) References Cited

U.S. PATENT DOCUMENTS

| | | |
|---|---|---|
| 10,755,357 B1 | 8/2020 | Davis et al. |
| 2012/0311416 A1* | 12/2012 | Richter ............... G06F 3/14 345/593 |
| 2013/0077819 A1 | 3/2013 | Du et al. |
| 2013/0110558 A1 | 5/2013 | Maher |
| 2013/0197807 A1 | 8/2013 | Du et al. |
| 2014/0257862 A1* | 9/2014 | Billman ............. G06Q 40/08 705/4 |
| 2014/0267257 A1 | 9/2014 | Overbeck et al. |
| 2015/0019267 A1 | 1/2015 | Prieto et al. |
| 2016/0048925 A1 | 2/2016 | Emison et al. |
| 2018/0276485 A1 | 9/2018 | Heck et al. |
| 2018/0336452 A1 | 11/2018 | Tschernezki et al. |
| 2019/0168787 A1* | 6/2019 | Messinger ............ G06V 20/52 |
| 2020/0034935 A1 | 1/2020 | Chavda |
| 2020/0159397 A1 | 5/2020 | Tohidi et al. |

\* cited by examiner

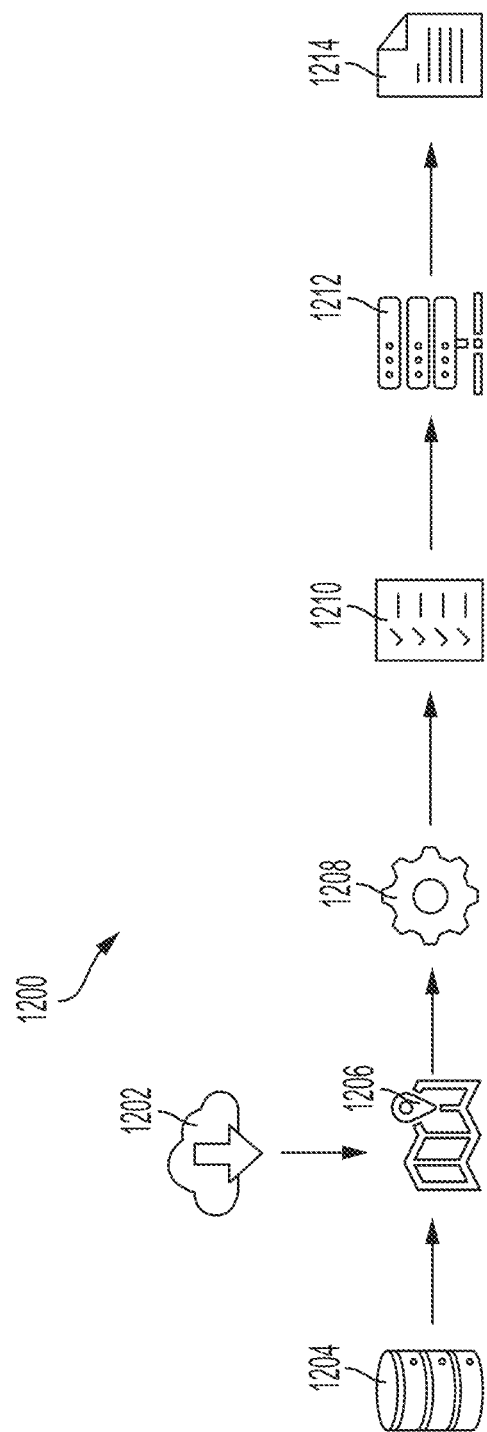

WILDFIRE DEFENDER

CROSS REFERENCE TO RELATED APPLICATIONS

This application is a continuation-in-part of U.S. patent application Ser. No. 17/192,120 filed Mar. 4, 2021, which is a continuation of U.S. patent application Ser. No. 16/585,565 filed Sep. 27, 2019 and issued as U.S. Pat. No. 10,964,201, the entire contents of which are specifically incorporated by reference herein.

BACKGROUND

Property in fire prone areas can have different risks of impact by a fire, such as a wildfire. There are various regulations and guidelines that define fire safety codes for establishing and maintaining a reduced impact of spreading a wildfire between properties. Fire safety codes may vary between jurisdictions and can change over time. Further, a property may initially comply with separation distance requirements between trees and dwellings as defined in fire safety codes, but over time, tree growth may result in reduced separation distances. Additionally, new vegetation may sprout and grow in previously open spaces that results in reduced separation distances. As compliance with fire safety codes changes over time, the risks of wildfire damage can change locally at a particular property and across neighboring properties.

BRIEF DESCRIPTION OF THE DRAWINGS

The subject matter which is regarded as the invention is particularly pointed out and distinctly claimed in the claims at the conclusion of the specification. The features and advantages of the invention are apparent from the following detailed description taken in conjunction with the accompanying drawings in which:

FIG. 12 depicts a process using wildfire risk analysis for rating and quoting according to some embodiments of the present invention;

DETAILED DESCRIPTION

Figure 1:
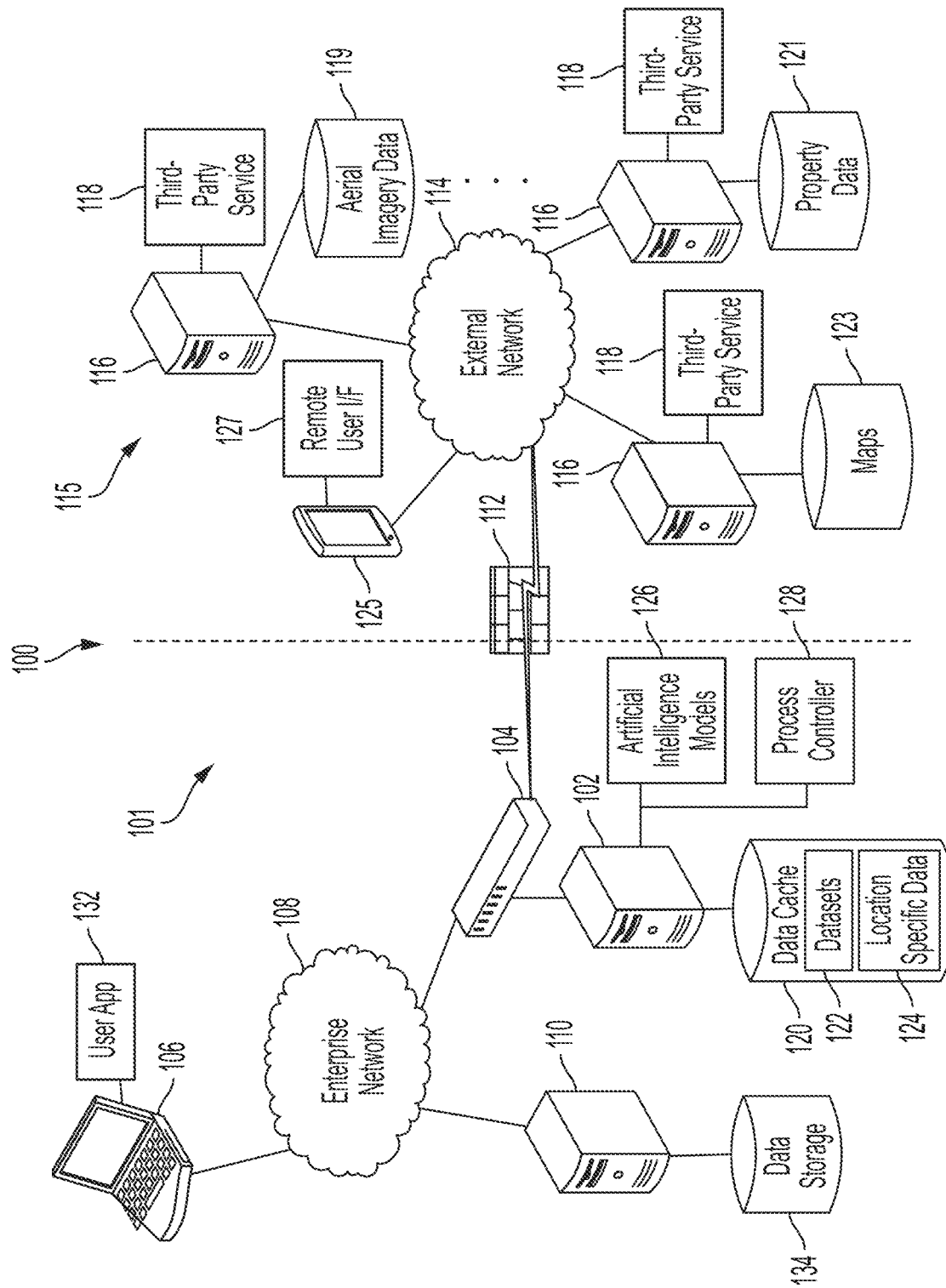
FIG. 1 depicts a block diagram of a system according to some embodiments of the present invention.

According to an embodiment, a system for wildfire risk analysis using image processing and supplemental data is provided. The system may be used for various practical applications of extracting information from image data in combination with one or more data sources. By using image data and accessing one or more related data sources, many wildfire risk factors can be determined for a geographic area. The wildfire risk data can be used to predict wildfire spread patterns, predictively alert parties in a likely fire spread path, and/or alert responders. Some types of data can be discovered from a single viewing perspective, such as an overhead view from aerial imagery data, using artificial intelligence/machine learning to locate features of interest in a large volume of data. Other types of data can be discovered when multiple datasets are merged or accessed in parallel. For example, using datasets from multiple viewing perspectives can enable construction of partial or complete three-dimensional models that can be further analyzed to discover features of interest using artificial intelligence/machine learning that may not be readily discernable from analyzing the datasets in isolation. A partial three-dimensional model can incorporate features or otherwise correlate features in three-dimensional space without creating a full rendering of objects in three-dimensional space. For instance, a planimetric image can be formed in one viewing perspective, and one or more other images having a different viewing perspective can be accessed to correlate data associated with a feature of interest from the planimetric image with the one or more other viewing perspectives to observe portions of the feature of interest in three-dimensional space. Some features of interest may be observed using only a single viewing perspective of a two-dimensional image. For example, a planimetric image can show a horizontal portion of features compiled into map features through a photogrammetric process with accurate horizontal distances between features, such as paved surfaces, building footprints, waterbodies, vegetation, and various manmade features.

Further, a group of machine-learning models can be developed that looks for specific features, groups of features, and various characteristics associated with properties viewed at a wider scale (e.g., a neighborhood) and a detailed lower-level scale, such as roofing or siding material type. The use of supplemental property data can enhance the visual data, such as identifying features that are not directly visible in the image data (e.g., property boundaries). The height and relative health of vegetation can be determined using the imagery, which can then be used to determine a predicted level of combustibility of the vegetation along with other factors. Ground covering, relative moisture, heat retention, natural fire barriers (e.g., bodies of rock or water), and other such features may be identified and used in wildfire risk analysis, as further described herein.

In embodiments, network performance may be enhanced by locally caching portions of datasets and analysis previously performed, for example, where real-time analysis is not needed. As learning is performed for a particular geographic area, records can be tagged with date/time stamps for comparison against source data in future iterations. For instance, if multiple users are accessing an analysis tool that performs machine learning for a particular geographic area, a copy of the analysis results can be stored within an enterprise storage system to prevent repetitive application of machine learning and data transfer requests across a network by using the stored copies of analysis results and/or datasets received from a third-party source. When a new request for analysis is made, the enterprise storage system can be checked first to see if a copy of the desired information is already locally available. Further, before requesting a new transfer of data from a remote data source, a date-time of last refresh can be checked at the remote data source to verify whether the desired data has been updated such that it no longer aligns with a copy previously acquired and stored within the enterprise storage system. If new data exists, then associated datasets can be transferred to the enterprise storage system to apply machine-learning processes on the updated data.

Turning now to FIG. 1, a system 100 is depicted upon which wildfire analysis may be implemented. The system 100 can include an enterprise network zone 101 including a data processing server 102 coupled to a gateway 104 operable to establish communication with one or more user systems 106, one or more data storage servers 110, and/or other devices (not depicted) through an enterprise network 108. The gateway 104 may also establish communication to an external network 114, for instance, through a firewall 112, to send data to and receive data from a plurality of third-party servers 116 in an external network zone 115. The third-party servers 116 can each execute one or more third-party services 118. Examples of third-party services 118 can include, for instance, data collection, processing and analytics services that operate on large volumes of data and are implemented by third parties, such as vendors, advisors, brokers, and the like. For instance, third-party services 118 can provide aerial imagery data 119, property data 121, and other such data. Further, the third-party services 118 can generate or manage various types of maps 123. Maps 123 can be geographic feature maps identifying topography of land and bodies of water, and/or weather maps of past, present, and future predictions (e.g., forecasts), for example. In some embodiments, one or more wildfire risk maps generated by the data processing server 102 can be stored in the maps 123 for use by various third-party services 118 or remote user systems 125 operable to execute a remote user interface 127. Although maps 123 are depicted as a single entity, it will be understood that the maps 123 can be distributed over multiple third-party servers 116, for instance, where geographic feature maps, weather maps, and wildfire risk maps are separately managed.

In embodiments, the enterprise network zone 101 can include a plurality of networked resources that may be distributed over multiple locations, where the networked resources are access-controlled by an enterprise. The external network zone 115 may link to networked resources that are outside of enterprise control and may be distributed over a wide geographic area.

In the example of FIG. 1, the data processing server 102 is operatively coupled to a data cache 120 that provides short-term data buffering of datasets 122 and location specific data 124 extracted from the third-party services 118 and further processed using artificial intelligence (AI) models 126. A process controller 128 can execute on the data processing server 102 to manage data acquisition, use of AI models 126, storage to the data cache 120, and interface with other components of the system 100. The AI models 126 can be trained to detect features of interest in the datasets 122 and location specific data 124. Further, the AI models 126 can apply multiple levels of models to discover patterns between multiple datasets 122 and derived characteristics. The AI models 126 can be applied across various file types and data structures, such as images, text, and/or other data formats. The AI models 126 can apply machine-learning algorithms to identify various features, such as buildings, objects, and other structures, along with characteristics of the buildings (e.g., footprint size, number of levels, roofing type, siding type, exterior condition, and other such characteristics). Features, such as property boundaries, can be extracted from the location specific data 124 to summarize features of specific properties, and wider-scale AI models 126 can be applied to discover neighborhood or regional patterns associated with a targeted geographic location. The AI models 126 can learn new types of patterns, variations, and/or rules as new instances of datasets 122 and location specific data 124 are encountered.

Examples of algorithms that may be applied to train the AI models 126 can include one or more of: supervised learning, unsupervised learning, semi-supervised learning, and reinforcement learning. For instance, labeled training data can be provided to train the AI models 126 to find model parameters that assist in detecting unlabeled data in the datasets. Linear regression and linear classifiers can be used in some embodiments. Other embodiments may use decision trees, k-means, principal component analysis, neural networks, and/or other known machine-learning algorithms. Further, the AI models 126 may use a combination of machine-learning techniques that can differ depending on whether the dataset includes text, image data, and/or layered data. Layered data can refer to multiple types of data associated with the same location, such as visible spectrum image data, infrared image data, depth data, and the like. For example, supervised learning with entity extraction can be used to learn text values, while generative adversarial networks can be used for image learning.

A user application 132 executed on one or more of the user systems 106 may provide an interface to select locations for analysis. The user application 132 can interface with the process controller 128 to determine whether characteristics associated with a targeted location have recently been analyzed by the AI models 126 with results available. For instance, when a targeted location is not captured in the datasets 122 and location specific data 124 in data cache 120, the process controller 128 can access the aerial imagery data 119 to extract one or more datasets and access the property data 121 for analysis by the AI models 126. Values of the aerial imagery data 119 may be stored temporarily in the datasets 122 and values of the property data 121 may be stored temporarily in the location specific data 124. The process controller 128 may perform preprocessing and post-processing on the datasets 122 and location specific data 124 prior to analysis by the AI models 126 and after results are determined by the AI models 126. The process controller 128 can store results of the AI models 126 in data storage to support longer-term trending analysis. If the user application 132 requests a location analysis for a location that already has associated data in the data cache 120, the process controller 128 may check a date/time stamp associated with the datasets 122 and location specific data 124 to determine whether more recent data is available in the aerial imagery data 119 or property data 121. If more recent data is available, then the more recent data can be transferred to the data cache 120 and updated analysis performed using the AI models 126. If the data in the data cache 120 is still fresh, then the results of previous analysis can be provided back to the user application 132 to increase responsiveness and reduce network traffic between the enterprise network zone 101 and the external network zone 115. Results of data processing using the AI models 126 can be provided to other models (not depicted) as part of a model hierarchy, such as risk models, loss models, and the like. Subsequent analysis and actions can be performed locally in the enterprise network zone 101, remotely in the external network zone 115, or a combination thereof.

In some embodiments, the user application 132 or another administrative application (not depicted) can configure one or more aspects of the AI models 126, for instance, to constrain features of interest for the AI models 126 to analyze. As an example, the user application 132 can operate in a two-dimensional analysis mode where image analysis is performed from a single viewing perspective to enhance responsiveness or a three-dimensional analysis mode where data from multiple viewing perspectives is combined to detect features in surfaces and contours that may not otherwise be discernable from a single viewing perspective. Further, the user application 132 may support a batch processing mode where a list of addresses is passed to the process controller 128 for analysis. The process controller 128 can create a plurality of records associated with batch processing for a plurality of properties and generate a sequence of processing requests based on the records. The processing requests can include a scoring computation, for instance, to estimate a condition, age, value, combustion risk, or other parameter associated with the identified features. In the case of preparing a quote for an insurance policy or other purpose, the result of a wildfire risk scoring computation based on comparing contents of a record to one or more scoring thresholds can be forwarded with the record to another application and/or user identifier associated with the property. Other processing and uses of the results from AI models 126 are contemplated and further described herein.

In the example of FIG. 1, each of the data processing server 102, user systems 106, data storage servers 110, third-party servers 116, and remote user systems 125 can include one or more processors (e.g., a processing device, such as one or more microprocessors, one or more microcontrollers, one or more digital signal processors) that receives instructions (e.g., from memory or like device), executes those instructions, and performs one or more processes defined by those instructions. Instructions may be embodied, for example, in one or more computer programs and/or one or more scripts. In one example, the system 100 executes computer instructions for implementing the exemplary processes described herein. Instructions that implement various process steps can be executed by different elements of the system 100. Although depicted separately, one or more of the data processing server 102, user systems 106, and/or data storage servers 110 can be combined or further subdivided. The system 100 can also include other subsystems (not depicted) that support processes which access and use data generated by the data processing server 102, user systems 106, data storage servers 110, third-party servers 116, and/or remote user systems 125.

The user systems 106 may each be implemented using a computer executing one or more computer programs for carrying out processes described herein. In one embodiment, the user systems 106 may each be a personal computer (e.g., a laptop, desktop, etc.), a network server-attached terminal (e.g., a thin client operating within a network), or a portable device (e.g., a tablet computer, personal digital assistant, smart phone, etc.). In an embodiment, the user systems 106 are operated by analysts seeking information about properties without having to physically travel to the properties. It will be understood that while only a single instance of the user systems 106 is shown in FIG. 1, there may be multiple user systems 106 coupled to the enterprise network 108 in embodiments. Similarly, remote user systems 125 can be used by remotely-deployed analysts or other types of users, such as parties having an interest in the condition of property. The remote user systems 125 can be used by property owners to understand wildfire risks and, in some embodiments, receive real-time alerts of a wildfire event in progress and a predicted arrival time of the wildfire at the property. Further, the remote user systems 125 can be used by first-responders in tracking wildfire spreading patterns and a predicted path of the wildfire, e.g., along routes having higher wildfire risk scores.

Each of the data processing server 102, user systems 106, data storage servers 110, third-party servers 116, and remote user systems 125 can include a local data storage device, such as a memory device. A memory device, also referred to herein as "computer-readable memory" (e.g., non-transitory memory devices as opposed to transmission devices or media), may generally store program instructions, code, and/or modules that, when executed by a processing device, cause a particular machine to function in accordance with one or more embodiments described herein. Aspects of the system 100 of FIG. 1 can be distributed in other arrangements beyond the example of FIG. 1. For instance, the AI models 126 may be trained and/or managed by one or more of the third-party services 118.

Figure 2:
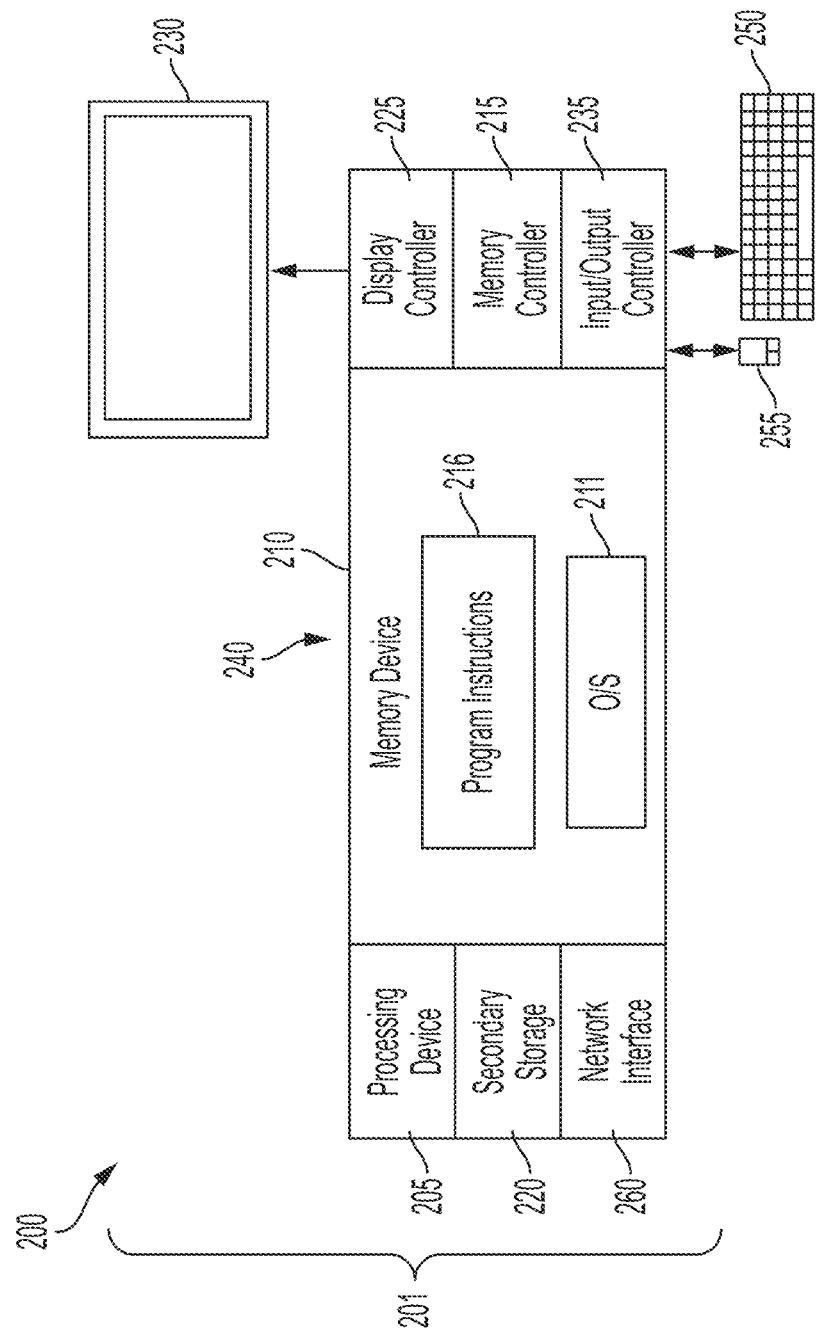
FIG. 2 depicts a block diagram of a system according to some embodiments of the present invention.

FIG. 2 depicts a block diagram of a system 200 according to an embodiment. The system 200 is depicted embodied in a computer 201 in FIG. 2. The system 200 is an example of one of the data processing server 102, user systems 106, data storage servers 110, third-party servers 116, and/or remote user systems 125 of FIG. 1.

In an exemplary embodiment, in terms of hardware architecture, as shown in FIG. 2, the computer 201 includes a processing device 205 and a memory device 210 coupled to a memory controller 215 and an input/output controller 235. The input/output controller 235 may comprise, for example, one or more buses or other wired or wireless connections, as is known in the art. The input/output controller 235 may have additional elements, which are omitted for simplicity, such as controllers, buffers (caches), drivers, repeaters, and receivers, to enable communications. Further, the computer 201 may include address, control, and/or data connections to enable appropriate communications among the aforementioned components.

In an exemplary embodiment, a keyboard 250 and mouse 255 or similar devices can be coupled to the input/output controller 235. Alternatively, input may be received via a touch-sensitive or motion sensitive interface (not depicted). The computer 201 can further include a display controller 225 coupled to a display 230.

The processing device 205 comprises a hardware device for executing software, particularly software stored in secondary storage 220 or memory device 210. The processing device 205 may comprise any custom made or commercially available computer processor, a central processing unit (CPU), an auxiliary processor among several processors associated with the computer 201, a semiconductor-based microprocessor (in the form of a microchip or chip set), a macro-processor, or generally any device for executing instructions.

The memory device 210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disk read only memory (CD-ROM), flash drive, disk, hard disk drive, diskette, cartridge, cassette or the like, etc.). Moreover, the memory device 210 may incorporate electronic, magnetic, optical, and/or other types of storage media. Accordingly, the memory device 210 is an example of a tangible computer readable storage medium upon which instructions executable by the processing device 205 may be embodied as a computer program product. The memory device 210 can have a distributed architecture, where various components are situated remotely from one another, but can be accessed by one or more instances of the processing device 205.

The instructions in memory device 210 may include one or more separate programs, each of which comprises an ordered listing of executable instructions for implementing logical functions. In the example of FIG. 2, the instructions in the memory device 210 include a suitable operating system (O/S) 211 and program instructions 216. The operating system 211 essentially controls the execution of other computer programs and provides scheduling, input-output control, file and data management, memory management, and communication control and related services. When the computer 201 is in operation, the processing device 205 is configured to execute instructions stored within the memory device 210, to communicate data to and from the memory device 210, and to generally control operations of the computer 201 pursuant to the instructions. Examples of program instructions 216 can include instructions to implement the third-party services 118, AI models 126, process controller 128, user application 132, and/or remote user interface 127 of FIG. 1.

The computer 201 of FIG. 2 also includes a network interface 260 that can establish communication channels with one or more other computer systems via one or more network links. The network interface 260 can support wired and/or wireless communication protocols known in the art. For example, when embodied in one of the user systems 106 or remote user systems 125 of FIG. 1, the network interface 260 can establish communication channels with at least one of the data processing server 102 or data storage servers 110 via the enterprise network 108 and/or with third-party servers 116 via external network 114.

Figure 3:
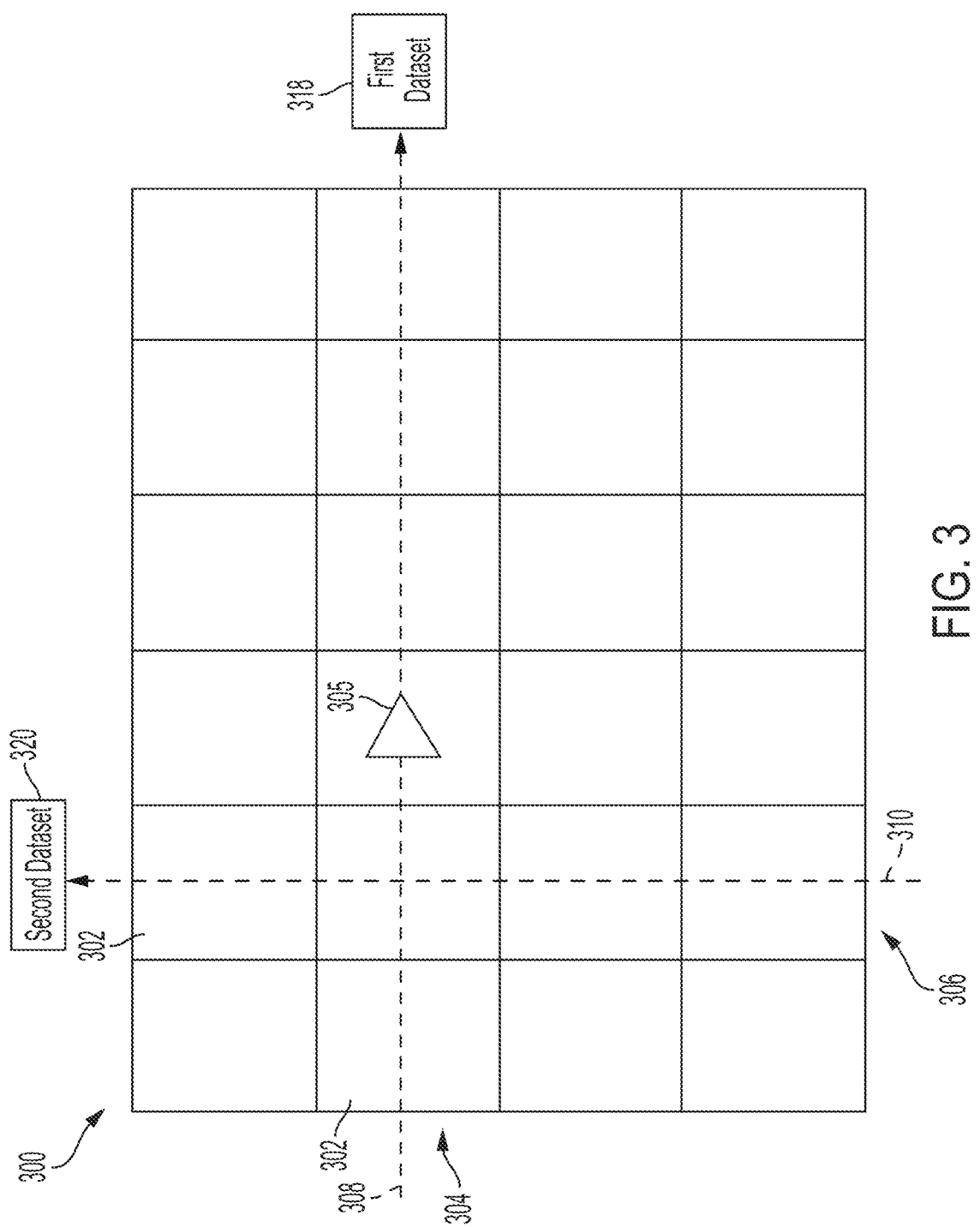
FIG. 3 depicts a data collection pattern according to some embodiments of the present invention.

FIG. 3 depicts a data collection pattern according to some embodiments. The data collection pattern can include capturing of data using a grid pattern 300. The grid pattern 300 may include a plurality of grid cells 302 that represent a geographic area as observed from a substantially consistent altitude forming a plurality of grid rows 304 and grid columns 306. A mobile observation platform 305 can travel in a first direction, such as across a grid row 304, to capture images and/or other types of data from a first viewing perspective 308 in a first dataset 318. For example, the mobile observation platform 305 can be an aircraft, such as an airplane, helicopter, drone, or the like. The sensing capabilities of the mobile observation platform 305 can include at least one camera configured to capture images or video in a visible spectrum across the grid rows 304. In some embodiments, the mobile observation platform 305 can capture layered data by capturing images using an infrared camera, a depth camera (e.g., LIDAR), and/or other imaging techniques known in the art. The mobile observation platform 305 can also traverse the same geographic area to capture images and/or other types of data across grid columns 306 of the grid pattern 300 from a second viewing perspective 310 in a second dataset 320. Data captured across the grid pattern 300 may be postprocessed to stitch the images together to make a larger scale area map that seamlessly links the grid cells 302 together. In some embodiments, the intermediate images of multiple frames captured may also be retained to show changing perspectives as the mobile observation platform 305 travels, which may reveal details that are obstructed when viewed from directly overhead or at an alternate angle of observation. As compared to conventional regional views of aerial imagery, which may be constrained to a resolution of about 50 cm per pixel, the aerial imagery data captured in the first dataset 318 and second dataset 320 may have a resolution of 7.5 cm per pixel, for example, which enables finer details to be observed. Sizing of the grid cells 302 can vary from a pixel-level to multiple meters or kilometers depending on the observation range, altitude during data collection, and zoom level set during data gathering. Although depicted as a uniform distribution of rectangular-shaped grid cells 302 for purposes of illustration, it will be understood that the grid pattern 300 can be a collection of non-uniform shaped polygons and may include partial boundaries. For instance, a coordinate space of the grid pattern 300 can align with property boundaries, which may have any orientation or shape, e.g., as impacted by features of the underlying terrain and other such constraints. Any type of coordinate system or coordinate transformation process may be supported.

Figure 4:
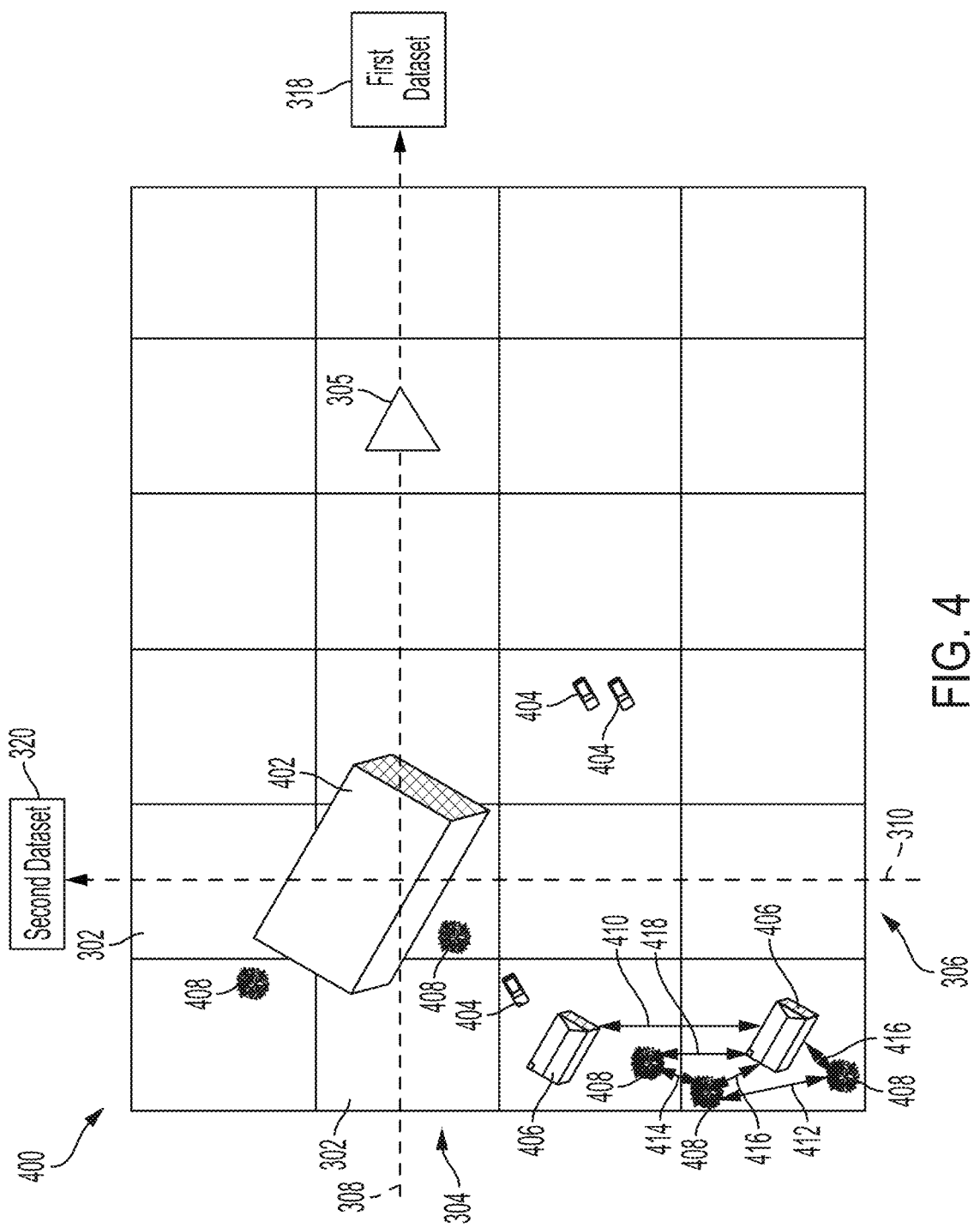
FIG. 4 depicts a simplified view of various objects that may be observed using the data collection pattern of FIG. 3 according to some embodiments of the present invention.

FIG. 4 depicts a simplified view of various objects that may be observed using the data collection pattern of FIG. 3 according to embodiments. In FIG. 4, a grid pattern 400 includes a different geographic area than that depicted in FIG. 3. The simplified example of FIG. 4 depicts how the mobile observation platform 305 may observe features on the ground from at least two different viewing perspectives, including the first viewing perspective 308 and the second viewing perspective 310 to form grid rows 304 and grid columns 306 of grid cells 302. Further, the mobile observation platform 305 may include cameras pointing in a direction of travel of the mobile observation platform 305 and in an opposite direction to the direction of travel. Thus, a structure, such as a building 402, a car 404, a house 406, vegetation 408, and/or other observable features, can be captured on approach, from above, and on egress from the first viewing perspective 308 and the second viewing perspective 310, such that a complete view is captured in the combination of the first dataset 318 and the second dataset 320.

The high-resolution image data can enable measurements between various features captured in the images and identified through the AI models 126 of FIG. 1. For instance, the AI models 126 can be used to determine an estimated distance 410 between houses 406 or other structures on the same property or between properties. Further, the AI models 126 can be used to determine an estimated distance 412 between vegetation 408 (e.g., trees) on the same property and/or determine an estimated distance 414 between vegetation 408 on different properties. As another example, the AI models 126 can be used to determine an estimated distance 416 between vegetation 408 and a house 406 or other structure on a same property or an estimated distance 418 between vegetation 408 and a house 406 or other structure on different properties. The estimated distances can be collected as separation data for further comparison in computing a defensible space adherence score and other such scores. Other distance estimates can also be computed beyond the examples illustrated with respect to FIG. 4. The AI models 126 can be trained to identify various objects with different levels of granularity. For example, building material type, building material condition, roof type, roof condition, vegetation type, vegetation condition, and other types of object classification can be performed where tracking such information assists in fire risk determination. Where objects, such as vehicles (e.g., cars 404) are considered in the defensible space adherence score and/or fire risk assessment, the AI models 126 may also be trained to distinguish between vehicle types, which may represent a fuel source (e.g., gasoline, diesel, lithium-based battery).

Figure 5:
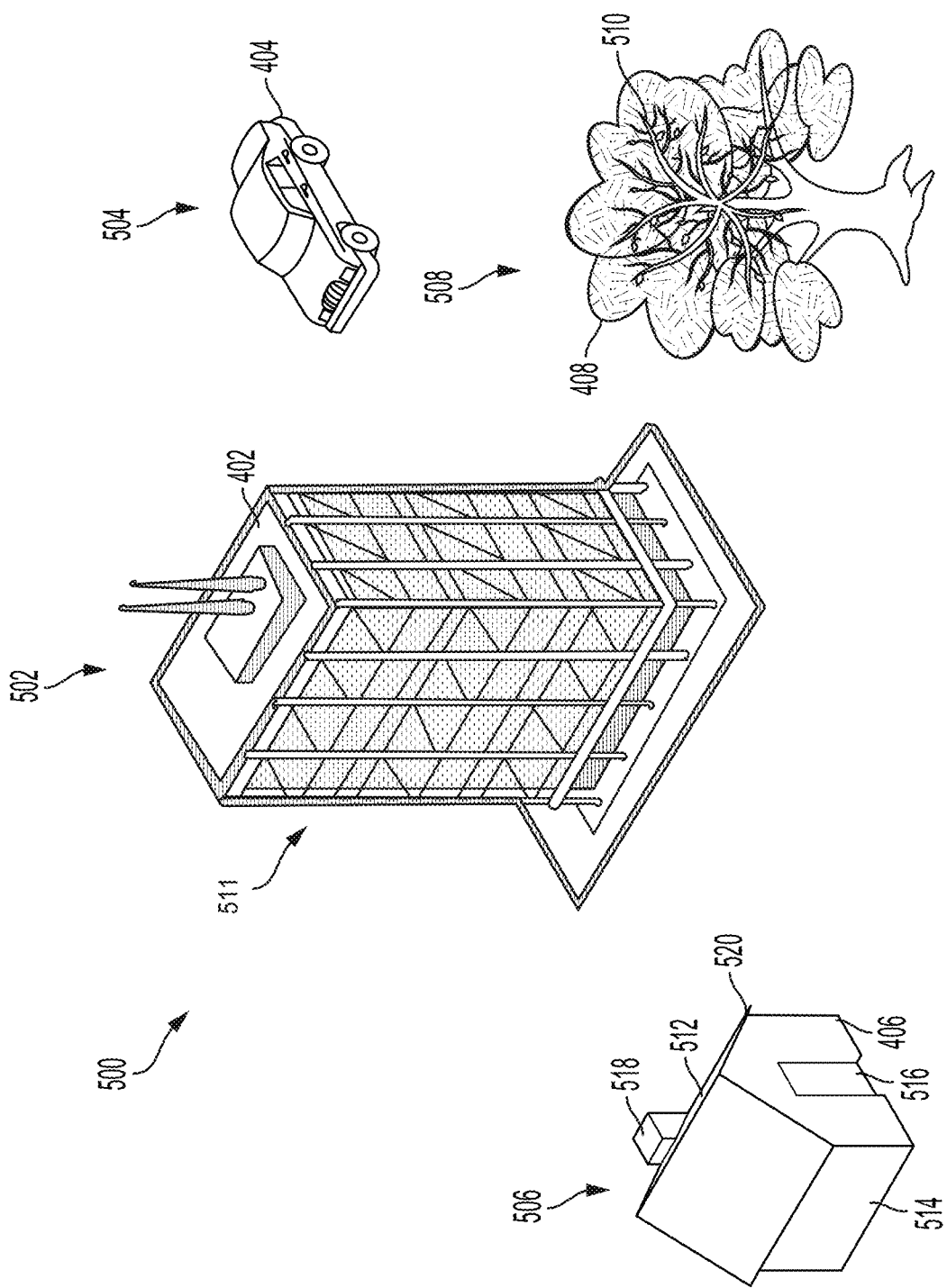
FIG. 5 depicts examples of three-dimensional models that can be constructed from multiple datasets according to some embodiments of the present invention.

FIG. 5 depicts examples of three-dimensional models 500 that can be constructed from multiple datasets according to embodiments. The data processing server 102 of FIG. 1 can merge data from the first dataset 318 and the second dataset 320 of FIG. 4 to create various three-dimensional models 502, 504, 506, 508, which can be partially or fully rendered. For example, a three-dimensional model 502 of building 402 of FIG. 4 can capture various details, such as a number of floors 511. A three-dimensional model 504 of personal property, such as car 404 of FIG. 4, can enable classifying a type of personal property as fixed or movable, as well as viewing the condition of the personal property for portions that are visible. In the example of the car 404, it may be difficult to discern certain features if parked in close proximity to other vehicles, structures, or other obstructions. In some instances, positioning of personal property in proximity to structures, such as a house 406 of FIG. 4, can temporarily impact a wildfire risk to the house 406 as a source of fuel for a fire to bridge a gap of otherwise open space for the fire to propagate. A three-dimensional model 506 of the house 406 of FIG. 4 can enable viewing of details, such as a roof 512, siding 514, windows/doors 516, a chimney 518, an overhang 520, and other such features, including features in proximity to the house 406. Details, such as the shape of the roof 512, state of the chimney 518 (e.g., presence of a chimney cap), vents (e.g., ridge vent in roof 512, soffits, end vents, etc.), building material type, and building material condition may be observed and tracked. Other details may include identifying a location of an electrical or gas utility connection at a structure. A three-dimensional model 508 of the vegetation 408 of FIG. 4, such as a tree, bush, or other plant life, can enable a determination of the approximate height/size, area, type/species, and condition of the vegetation 408. The three-dimensional model 508 of vegetation 408 can reveal aspects, such as dead spots 510 that may not be discernable in some views. Other such features captured in the first dataset 318 and the second dataset 320 can be modeled as well. In some embodiments, the formation of the three-dimensional models 500 can be performed by another entity, such as the third-party servers 116 of FIG. 1. The three-dimensional models 500 may have varying levels of detail, such that data relating to features of interest is more fully defined in the context of three-dimensional space, while other potentially observable features are rendered in two-dimensional space. In some embodiments having sufficient processing and memory bandwidth, the three-dimensional models 500 can be fully rendered rather than partially rendered. As a greater level of detail is desired for a feature of interest, multiple viewing perspectives can be accessed to correlate different views, such as a planimetric image with one or more viewing perspectives to identify related details in three-dimensional space.

Figure 6:
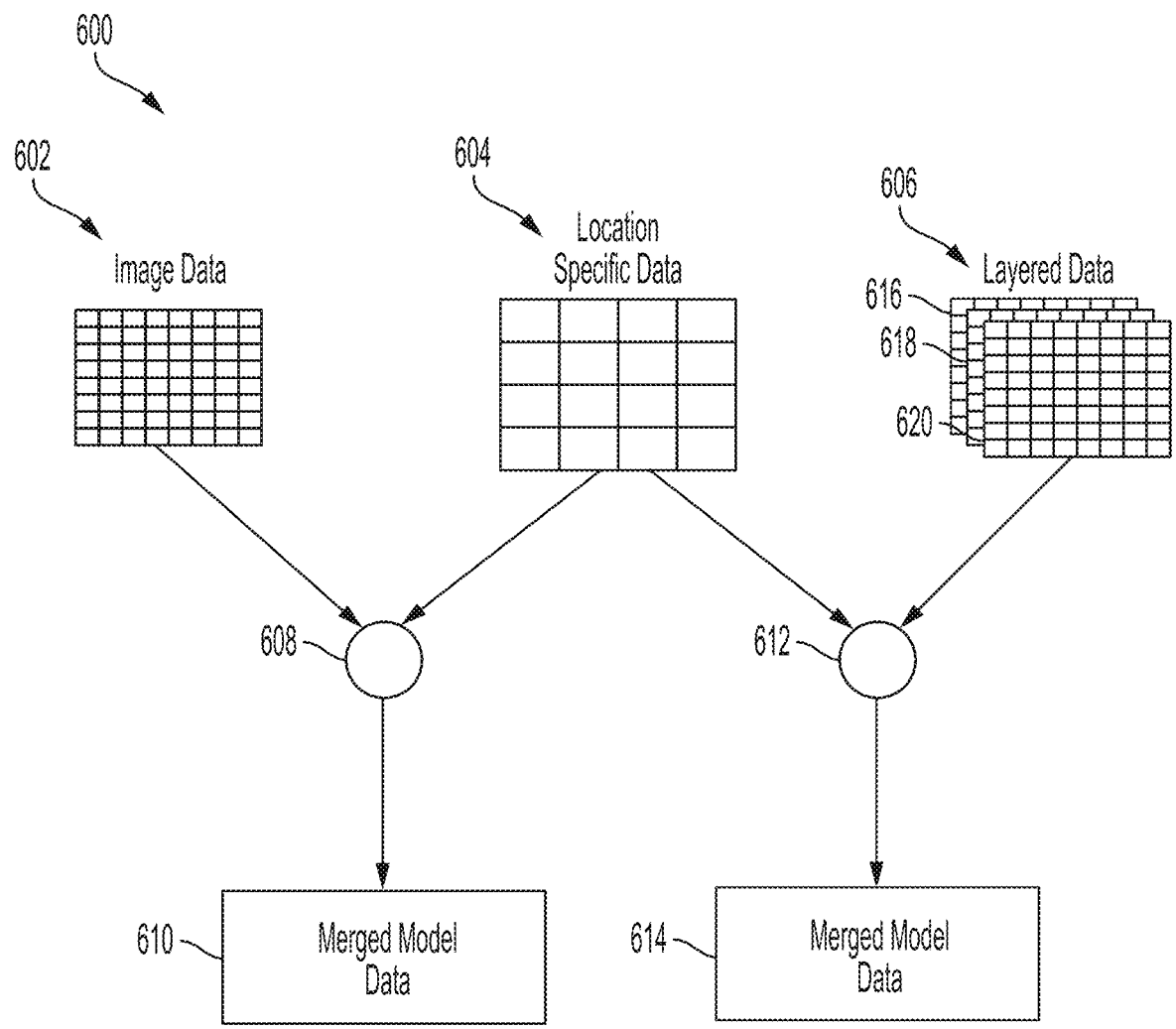
FIG. 6 depicts a data merging process to form merged model data according to some embodiments of the present invention.

FIG. 6 depicts a data merging process 600 to form merged model data according to some embodiments. Different types of data with different resolution can be merged by the data processing server 102 of FIG. 1. As an example, image data 602 can be accessed from the aerial imagery data 119 of FIG. 1 and be stored as part of datasets 122 of FIG. 1. Location specific data 604 can be accessed from the property data 121 of FIG. 1 and/or other sources and be stored as part of location specific data 124 of FIG. 1. Pixels of image data 602 can represent very small areas (e.g., cm scale), while the location specific data 604 may represent data at a different scale or different units (e.g., coordinate system) to define a property location and boundaries. The data processing server 102 can perform processing to map location information represented in the image data 602 to location information represented in the location specific data 604. Data merging 608 can link or otherwise combine portions of the image data 602 and location specific data 604 into a combined format that can be understood by the AI models 126 of FIG. 1 as merged model data 610. Similarly, where more detailed data is available, such as layered data 606, a separate data merging 612 can be used to form merged model data 614 that links or combines the location specific data 604 with the layered data 606. As an example, the layered data 606 can include two or more of a visible light image layer 616, an infrared image layer 618, and a depth layer 620. The visible light image layer 616 can be formatted as pixels using a color space, such as red-green-blue (RGB) pixels, grayscale intensity, or other known image formats. Using a combination of sensors (e.g., a visible-spectrum camera, an infrared camera, and a depth sensor) in parallel to collect data can enable the visible light image layer 616, the infrared image layer 618, and the depth layer 620 to be captured at the same time to provide visual data, heat-based data, and height data in a same viewing area and a same time for each data frame of the layered data 606. The data merging 608, 612 can enable inputs having various characteristics and scaling to be normalized or otherwise preprocessed for use by the AI models 126. With respect to the first dataset 318 from the first viewing perspective 308 and the second dataset 320 from the second viewing perspective 310, each dataset 318, 320 may have separate merged model data 610, 614 to perform perspective-specific or simplified analysis. The three-dimensional models 500 can have separate combinations of the merged model data 610, 614 formed as merged with location specific data 604, if desired. It will be understood that any number of data sources can be merged, and in some embodiments, data sources can be processed using the AI models 126 without merging. In some embodiments, the data merging process 600 can be performed by another entity, such as the third-party servers 116 of FIG. 1. Although depicted as uniform grids in FIG. 6, the location specific data 604 may be formed of irregular polygons. Further, layers 616, 618, and 620 may have different resolutions and/or non-uniformity of distribution depending on the resolution and collection perspective of underlying sensors used to collect data. Embodiments can manage different coordinate spaces or make function calls to existing space transformation services to enable the different coordinate spaces to be correlated.

Figure 7:
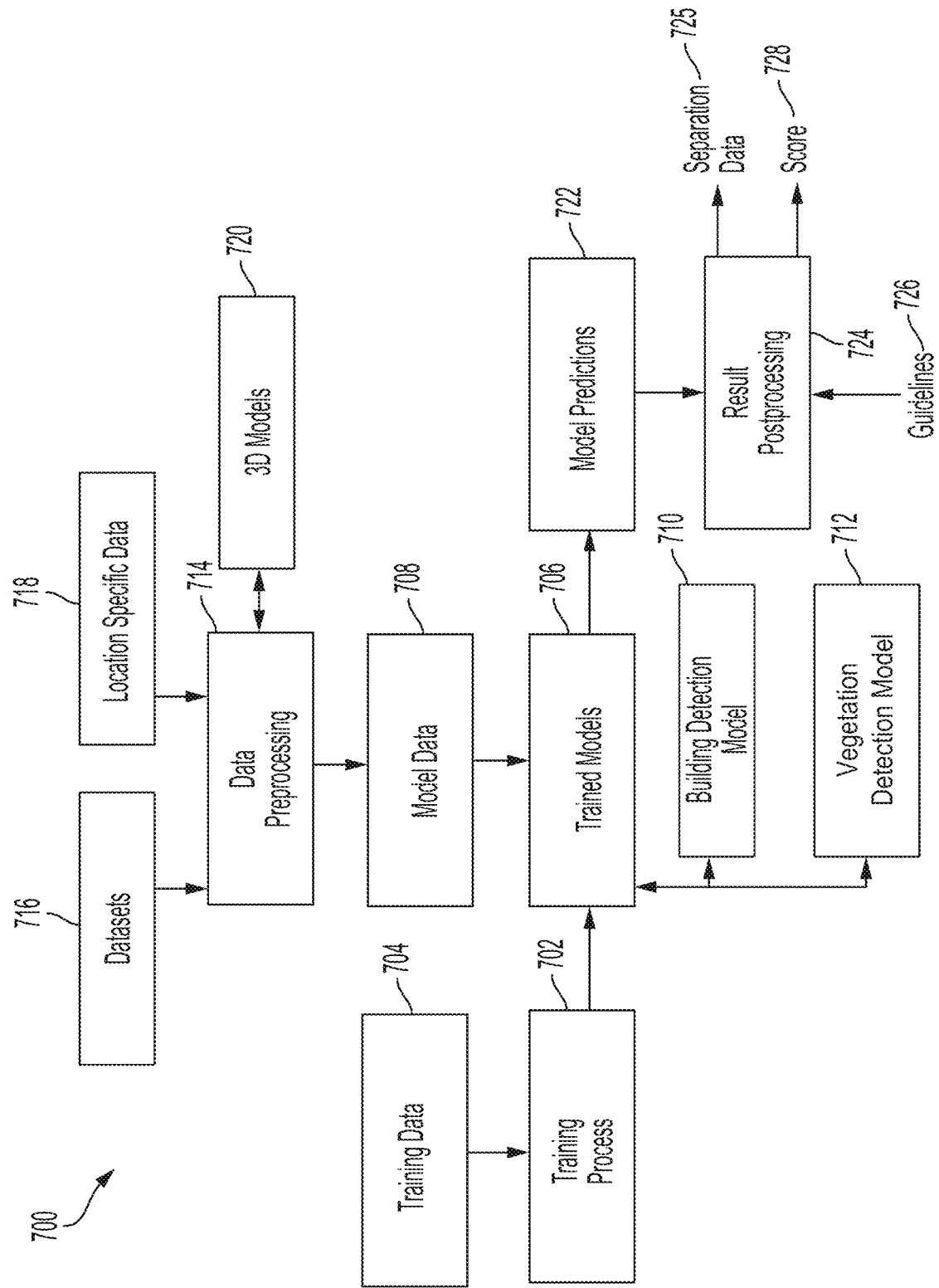
FIG. 7 depicts a training and prediction process according to some embodiments of the present invention.

FIG. 7 depicts a training and prediction process 700 according to some embodiments. The training and prediction process 700 can include a training process 702 that analyzes training data 704 to develop trained models 706 as examples of the AI models 126 of FIG. 1. The training process 702 can use labeled or unlabeled data in the training data 704 to learn features, such as a building footprint, roof identification, construction material type, various property features, and/or other derived characteristics. The training data 704 can include a set of training images and other data to establish a ground truth for learning coefficients/weights and other such features known in the art of machine learning to develop trained models 706. The training data 704 can include multiple layers of data, such as visual image data, infrared image data, and depth data to support training across multiple sensor types in parallel. For instance, classification of objects can be defined in terms of a combination of one or more types of images with depth data for three-dimensional analysis. The trained models 706 can include a family of models to identify specific types of features from model data 708. For example, the trained models 706 can include a building detection model 710 and a vegetation detection model 712. Other such models and further subdivision of the trained models 706 can be incorporated in various embodiments. The building detection model 710 can predict, for instance, a roof location of a building based on individual pixel data and an aggregation of the individual pixel data. The vegetation detection model 712 can identify vegetation position, a vegetation outline, type, health, and other such features with seasonal adjustments, such as summer condition versus winter condition. Further, the building detection model 710 and vegetation detection model 712 can be tuned to look for specific features, such as identifying a roof overhang of the building based on a three-dimensional model or other data or identifying branches extending in closer proximity to a portion of a building. Distinguishing features, such as overhangs, can improve the accuracy of building footprint determinations of the underlying structure below the roof. Further, vegetation health can change a fire risk along with the presence of leaves/needles and moisture content.

In embodiments, the building detection model 710 can be created based on a building footprint dataset, which may be extracted from the property data 121 of FIG. 1 associated with a geographic area defined in the training data 704. Building footprints in the training data 704 can overlay image data extracted from the aerial imagery data 119 of FIG. 1 associated with the geographic area defined in the training data 704. An expert can view the alignment and make adjustments to fix skewed alignment results as an adjusted training set in the training data 704. The adjusted training set in the training data 704 can be used for the building detection model 710. The training process 702 can train the building detection model 710 using machine-learning techniques, such as image segmentation with masking and regions with convolutional neural networks or other such techniques to support building footprint detection based on image data from the aerial imagery data 119. As another example, the vegetation detection model 712 can start with image data extracted from the aerial imagery data 119 of FIG. 1 associated with a geographic area defined in the training data 704. An expert can trace vegetation details, such as tree canopies through a graphical user interface and label the tree canopies. Examples can be selected for many vegetation types and seasonal variations at multiple geographic areas. Image segmentation can be performed on tree canopies rather than trunks or centroids to distinguish between tree canopy size and position with greater accuracy. Where sufficient information is available in the training data 704, the vegetation detection model 712 can be trained to characterize vegetation size, classify vegetation type (e.g., tree, bush, shrub, grass, flowers, etc.), and/or classify a species of vegetation. The training process 702 can train the vegetation detection model 712 using machine-learning techniques, such as image segmentation with masking and regions with convolutional neural networks or other such techniques to support vegetation detection based on image data from the aerial imagery data 119. The vegetation detection model 712 can also be trained beyond two-dimensional canopy detection and may use infrared and/or point-cloud data (e.g., height/depth data) for enhanced feature detection, if available in the aerial imagery data 119 or another source. Infrared data can be used, for instance, to distinguish between live versus dead vegetation and different vegetation species. Point-cloud data can be used to identify the height of vegetation and shrubs and may assist in identifying other characteristics, such as tracking rate of growth over a period of time.

The model data 708 can include the merged model data 610, 614 of FIG. 6 or other such data available to apply the trained models 706. Datasets 716 and location specific data 718 are embodiments of the datasets 122 and location specific data 124 of FIG. 1, where data preprocessing 714 can be applied to produce the model data 708. The data preprocessing 714 can include the data merging 608, 612 of FIG. 6 and creation or access of one or more three-dimensional models 720, such as the three-dimensional model 502 of building 402 of FIG. 5 and three-dimensional model 508 of vegetation 408 of FIG. 5.

Applying the trained models 706 to the model data 708 can result in model predictions 722. The model predictions 722 can predict whether a pixel of image data is likely part of a building, for example, and whether the pixel represents a feature, such as a roof, siding, decking, door, or window, for instance. As greater details are refined, the trained models 706 can make more specific predictions for one or more derived characteristics of a building, such as a roofing material, a roof shape, a siding material, and a chimney condition. For vegetation, the model predictions 722 can identify whether a pixel is likely part of a particular type of plant, ground covering, or tree, along with finer details, such as branches. The trained models 706 may also predict whether pixels represent one or more property features, such as one or more of a deck, a shed, a pool, a patio, a garage, a playscape, a greenhouse, a fence, a driveway, a vehicle, a fire hydrant, a water source, a fuel storage source, an unknown structure, and/or a property contents. The results of model predictions 722 can be further conditioned by result postprocessing 724.

The result postprocessing 724 can cross-compare results of the model predictions 722 to make a final determination of the most likely feature and/or condition captured by a pixel or group of pixels. The result postprocessing 724 can summarize results to highlight regions, such as pixels collectively grouped as a roof of a single structure, as well as other associated data or a tree canopy, for example. The result postprocessing 724 may also perform comparisons and computations of results between the model predictions 722, such as determining an estimated distance between one or more vegetation areas and a building (e.g., nearest portion of a building footprint) as separation data 725. To enhance prediction confidence, model data 708 or inputs to the model data 708 can be rotated, and the model predictions 722 can be performed after each rotation. For example, using the same image (including one or more layers), rotations in increments of ninety degrees can be analyzed with model predictions 722 to confirm whether identified features or conditions are consistently observed with a similar level of confidence. This can help to reduce the impact of shadows resulting in false positives. If, for instance, a tree is found, to identify the canopy of the tree, multiple iterations of analysis with rotations can be used to confirm that the canopy shape identified is consistent with a confidence level at or above a confidence threshold. In the example of an initial image analysis with model predictions 722 followed by three ninety-degree rotation analysis iterations, if a feature or characteristic is identified (e.g., with a confidence>=a confidence threshold) using the building detection model 710 or vegetation detection model 712 in all four or three out of four iterations of model predictions 722, then the feature or characteristic is confirmed. If the feature or characteristic is only identified for half or fewer iterations of model predictions 722, then the feature or characteristic is unconfirmed and may not be used in further processing as part of the result postprocessing 724.

The result postprocessing 724 can also compare the separation data 725 to a defensible space guideline 726 to determine a defensible space adherence score 728. Further processes managed by the process controller 128 of FIG. 1 can take additional actions, such as generating a wildfire risk map (e.g., wildfire risk map 800 of FIG. 8) including the defensible space adherence score 728 associated with a geographic area and constrained by property boundaries, as further described with respect to FIG. 8.

Figure 8:
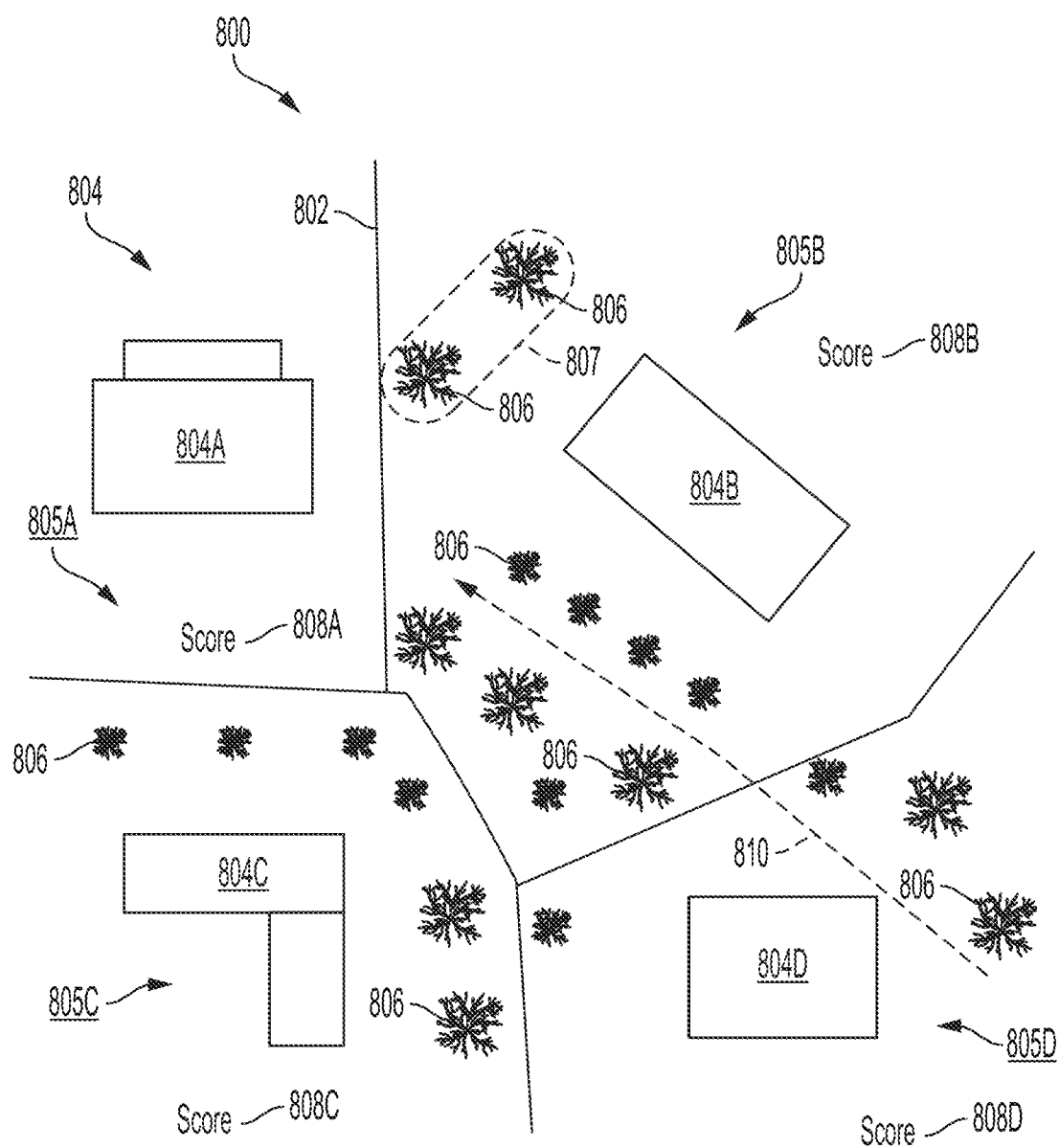
FIG. 8 depicts a wildfire risk map according to some embodiments of the present invention.

FIG. 8 depicts a wildfire risk map 800 according to some embodiments. The wildfire risk map 800 can be generated by the data processing server 102 of FIG. 1 responsive to the process controller 128 of FIG. 1. In the example of FIG. 8, the wildfire risk map 800 includes property boundaries 802 with building footprints 804, including building footprint 804A, 804B, 804C, and 804D for properties 805A, 805B, 805C, and 805D. The building footprints 804 can be any type of structure, such as a house, a multi-family dwelling, an apartment building, a commercial building, and the like. The wildfire risk map 800 can also depict a plurality of trees 806 as examples of vegetation. Separation distances between trees 806 (or other vegetation) and building footprints 804 can be computed as separation data, but may not be visible on the wildfire risk map 800. For example, an estimated distance between each of the one or more trees 806 and a nearest portion of the building footprint 804 can be determined as separation data. Neighboring tree pairs 807 (or other vegetation) can be analyzed to determine distances between multiple trees 806. The separation data can be compared to a defensible space guideline to determine a defensible space adherence score 808A, 808B, 808C, 808D associated with each of the properties 805A, 805B, 805C, 805D. The wildfire risk map 800 can be generated with the defensible space adherence scores 808A, 808B, 808C, 8080D associated with a geographic area and constrained by the property boundaries 802. Data in the wildfire risk map 800 can be used for various purposes, such as predicting a fire path spread pattern 810 between the one or more neighboring properties 805A-805D based on geographic features in combination with building footprints 804A-804D, trees 806, other objects, structures, vegetation, and other such data.

Figure 9:
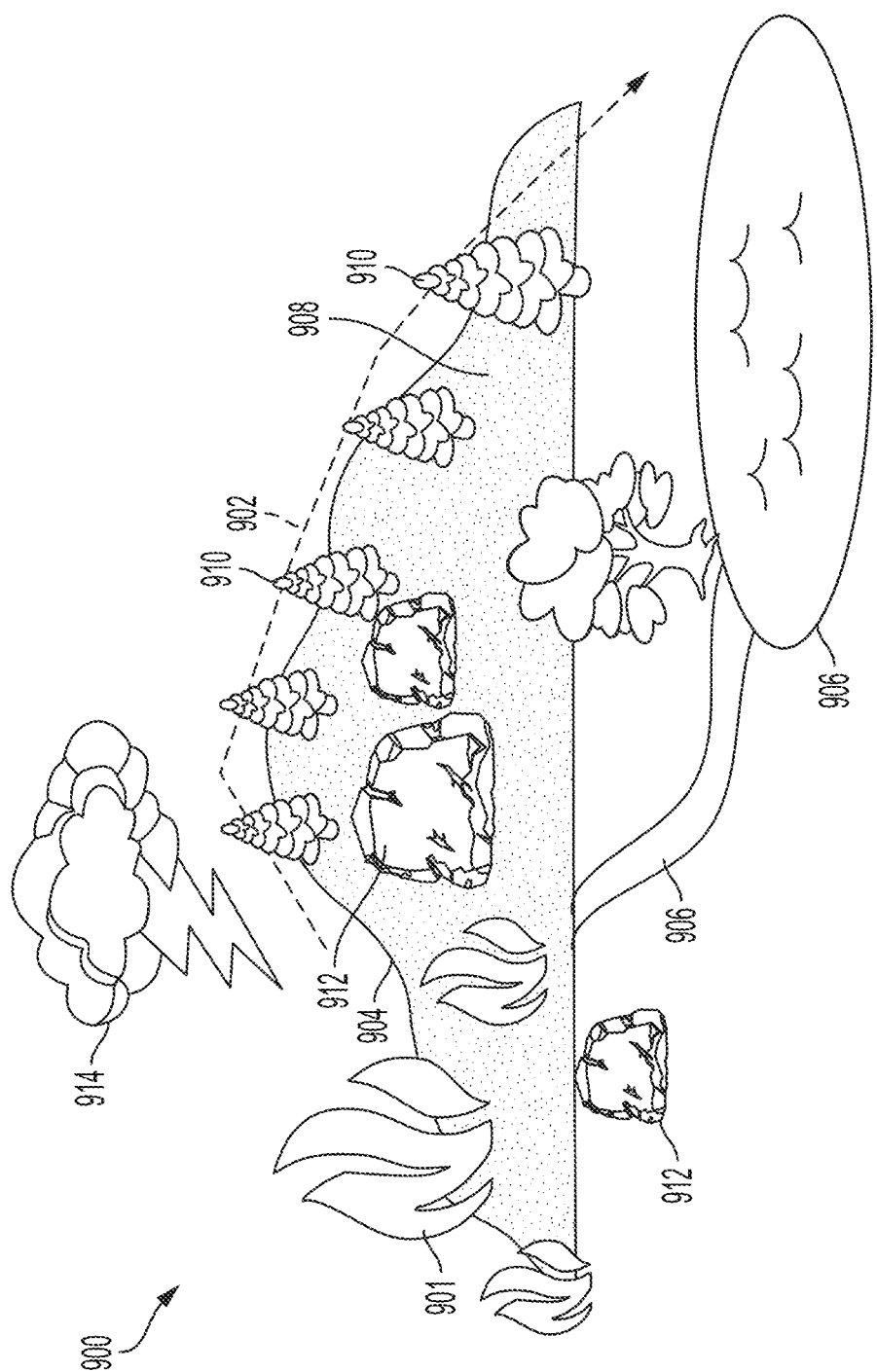
FIG. 9 depicts an example of geographic features that can impact a fire path spread pattern according to some embodiments of the present invention.

FIG. 9 depicts an example of geographic features 900 that can impact a fire path spread pattern 902 according to some embodiments. In FIG. 9, geographic features 900 can include one or more of: an elevation 904, a body of water 906, and a type of ground covering 908. The geographic features 900 may be observed in a combination of image data and map data from the aerial imagery data 119 and/or maps 123 of FIG. 1 for the AI models 126 of FIG. 1 to predict the fire path spread pattern 902. Changes in elevation 904, such as hills and valleys can impact the fire path spread pattern 902 of a wildfire 901. For example, the elevation 904 may impact spreading due to wind patterns, vegetation 910 and impediments, such as rocks 912. Bodies of water 906 can include, for instance, streams, rivers, ponds, lakes, oceans, and the like. The type of ground covering 908 can be grass, brush, sand, gravel, dirt, and the like. In some embodiments, weather data 914 can be used in predicting the fire path spread pattern 902, for instance, where precipitation is likely, where thunderstorms are likely, where hot/dry weather is expected, and other such patterns and trends over a period of time. The weather data 914 can be captured and retrieved from the maps 123 of FIG. 1 or otherwise observed/forecast.

Figure 10:
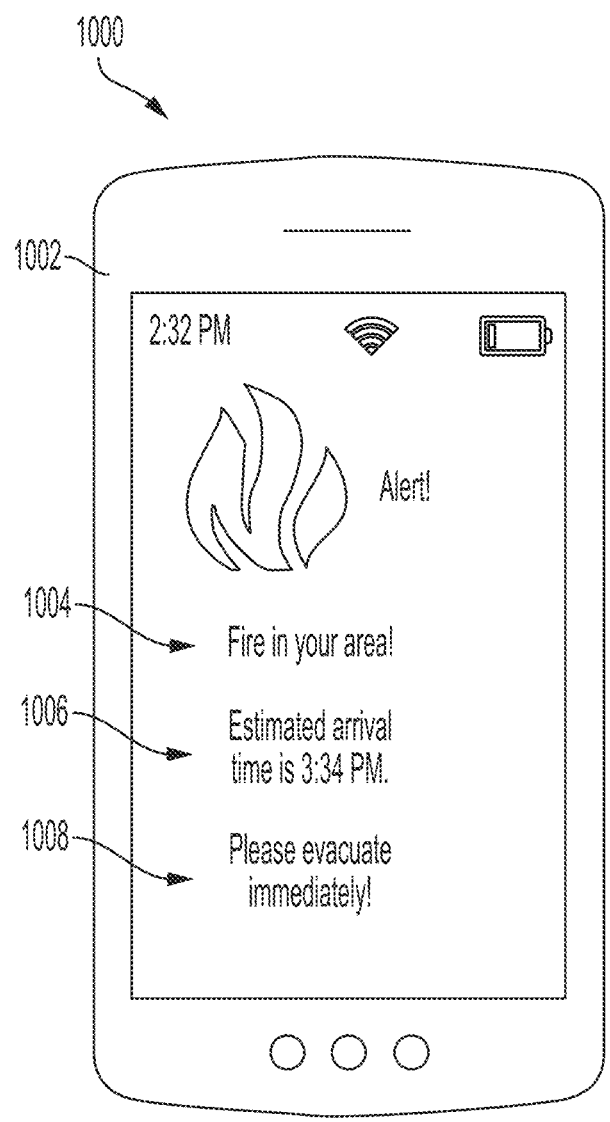
FIG. 10 depicts a remote user interface example according to some embodiments of the present invention.

FIG. 10 depicts a remote user interface 1000 example according to some embodiments. The remote user interface 1000 is an example of the remote user interface 127 of FIG. 1 where one of the remote user systems 125 is depicted as a mobile user device 1002. The remote user interface 1000 can output a notification 1004 of a fire event and a fire spread path with a fire arrival time 1006 and a recommended course of action 1008. Other information and content can be output to the remote user interface 1000. The content provided to the remote user interface 1000 may be determined and transmitted from the data processing server 102 of FIG. 1. Alternatively, a third-party server 116 of FIG. 1 can produce content for the remote user interface 1000 based on data produced by the data processing server 102, such as the wildfire risk map 800, fire path spread pattern 810, and location of properties 805A-805D of FIG. 8. Alerts can be generated for targeted users based on a specific risk or can be distributed as community alerts to neighborhoods and/or wider-scale areas. For example, the data processing server 102 of FIG. 1 may send targeted notifications to designated government entities or community organizations associated with a geographic area, which can then relay and distribute the notifications to specific neighborhoods.

Figure 11:
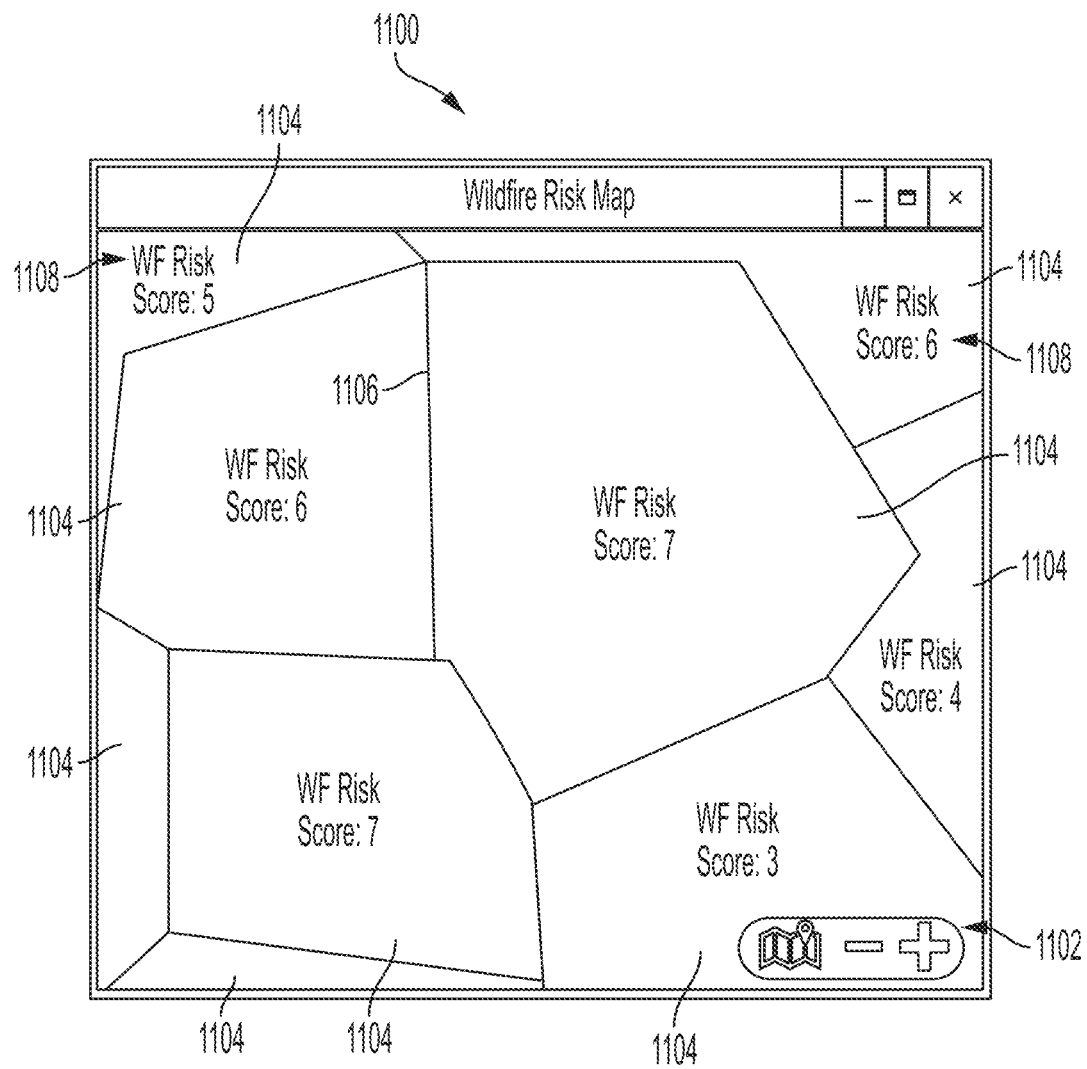
FIG. 11 depicts a user interface according to some embodiments of the present invention.

FIG. 11 depicts a user interface 1100 according to some embodiments. In the example of FIG. 11, the user interface 1100 can be used to allow a user to select details of an image of the aerial imagery data 119 of FIG. 1 through the user application 132 of FIG. 1 as part of a wildfire risk map to analyze. The user interface 1100 can provide a graphical user interface 1102 to select commands, provide address input, and control image viewing, such as zoom controls and making different features or layers visible on the user interface 1100. The example of FIG. 11 illustrates a plurality of properties 1104 with property boundaries 1106 and wildfire risk scores 1108, such as defensible space adherence scores for a selected geographic area. The wildfire risk scores 1108 can indicate whether an underlying property 1104 is at higher or lower risk of wildfire impact to dwellings or other structures, for instance based on meeting a defensible space guideline 726 and/or other factors that impact fire spread. For instance, wildfire risk scores 1108 may also incorporate a fire risk adjustment based on moisture content of vegetation in proximity to buildings, structures, and/or other objects. Other features and derived characteristics may also or alternatively be displayed through the user interface 1100. Although one example is depicted in FIG. 11, it will be understood that many variations are contemplated, including additional interfaces, command options, and identification options.

FIG. 12 depicts a process 1200 of using wildfire risk analysis for rating and quoting according to some embodiments. The process 1200 can be performed, for example, by the system 100 of FIG. 1. Visual high resolution aerial imagery is queried 1202 for a location of interest, for instance, from aerial imagery data 119 of FIG. 1. Information on individual locations 1204 can be captured on a location-by-location basis and may be accessed from the property data 121 of FIG. 1. A data merging process 1206 can combine the data and pass merged data through one or more AI models 126 of FIG. 1 to test for the presence of particular attributes at block 1208, such as separation data based on an estimated distance between one or more trees and a nearest portion of a building footprint. Separation may also be determined in three-dimensional space between buildings and vegetation areas. The separation data can be compared to a defensible space guideline to determine a defensible space adherence score. The output of the AI models 126 can be the defensible space adherence score or other such wildfire-related scores that are fed to a rate-quote-issue system 1210, which may be part of system 100 of FIG. 1 or located in another networked environment. In some embodiments, a processing request output to the rate-quote-issue system 1210 can include population of one or more electronic forms in the rate-quote-issue system 1210 as a second system based on a record resulting from the AI models 126 at block 1208. Scores from the rate-quote-issue system 1210 can be fed to a rating engine 1212. The rate-quote-issue system 1210 and/or the rating engine 1212 can apply other models (e.g., risk models, loss models) to use the defensible space adherence score or other such wildfire-related scores in determining loss risk scores, potential loss amounts, and other such values. The rating engine 1212 can apply the scores to determine whether a risk threshold is met or exceeded and determine potential limits to apply if a quote is generated. A quote can be submitted 1214 from the rating engine 1212 to an end user/customer. The process 1200 can be initiated through the user application 132 and managed by the process controller 128 of FIG. 1 in combination with one or more other applications (not depicted).

Figure 13A:
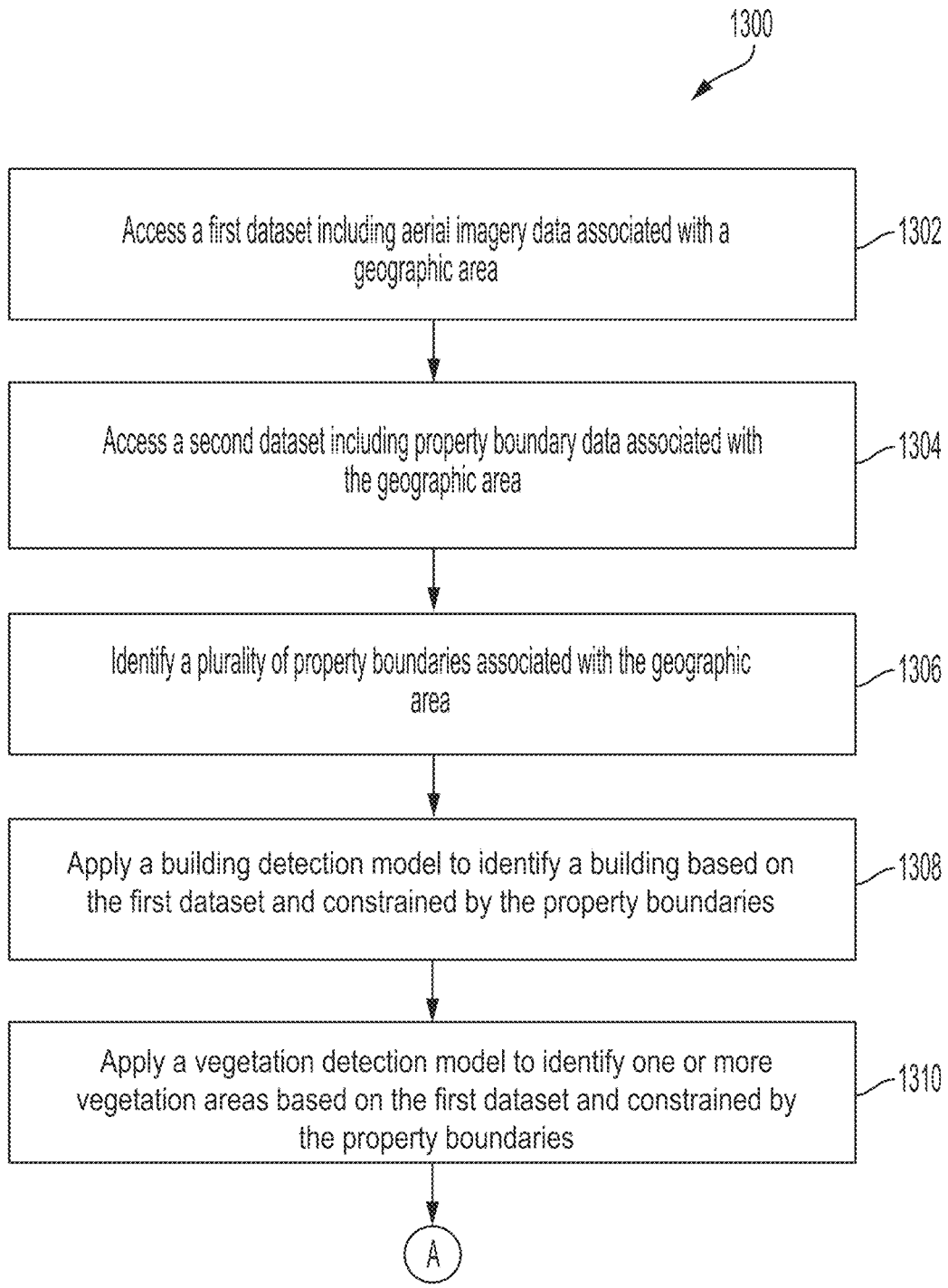
FIGS. 13A and 13B depict a process flow according to some embodiments of the present invention.
Figure 13B:
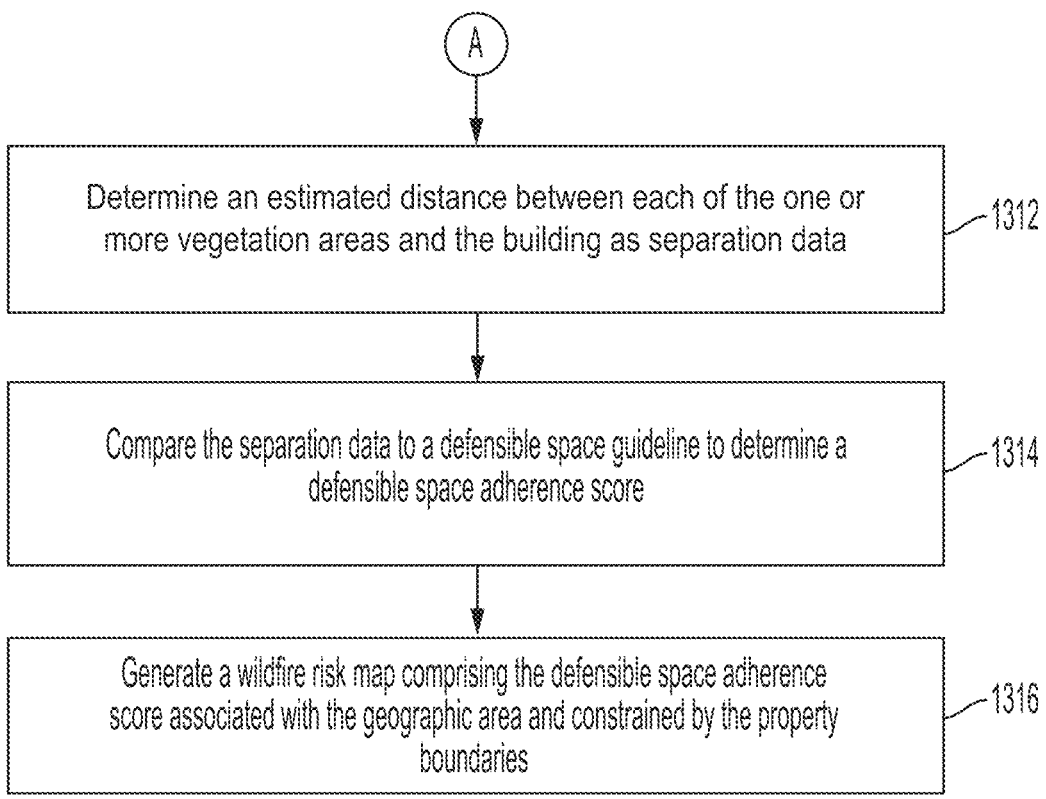
Figure 14:
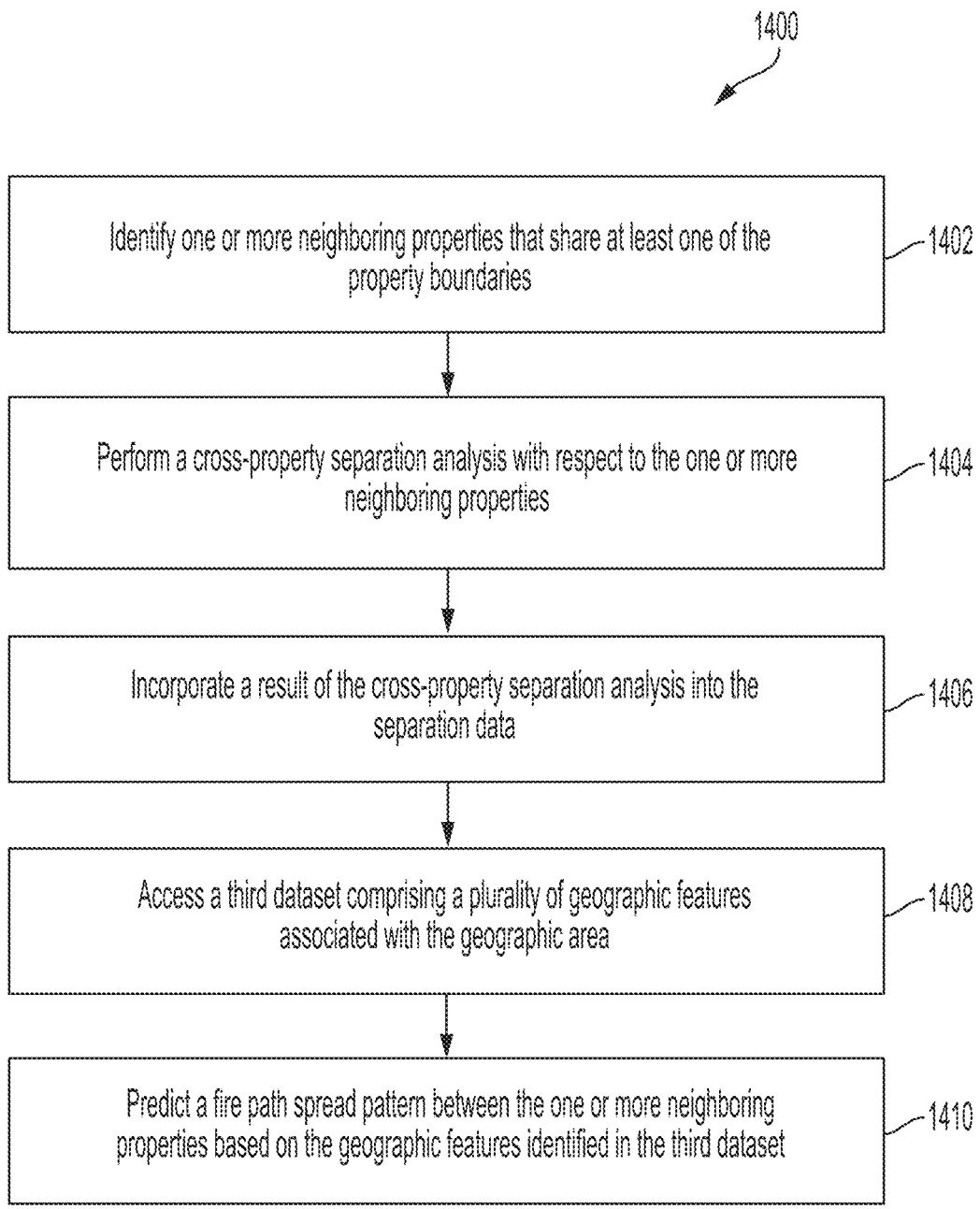
FIG. 14 depicts a process flow according to some embodiments of the present invention.
Figure 15:
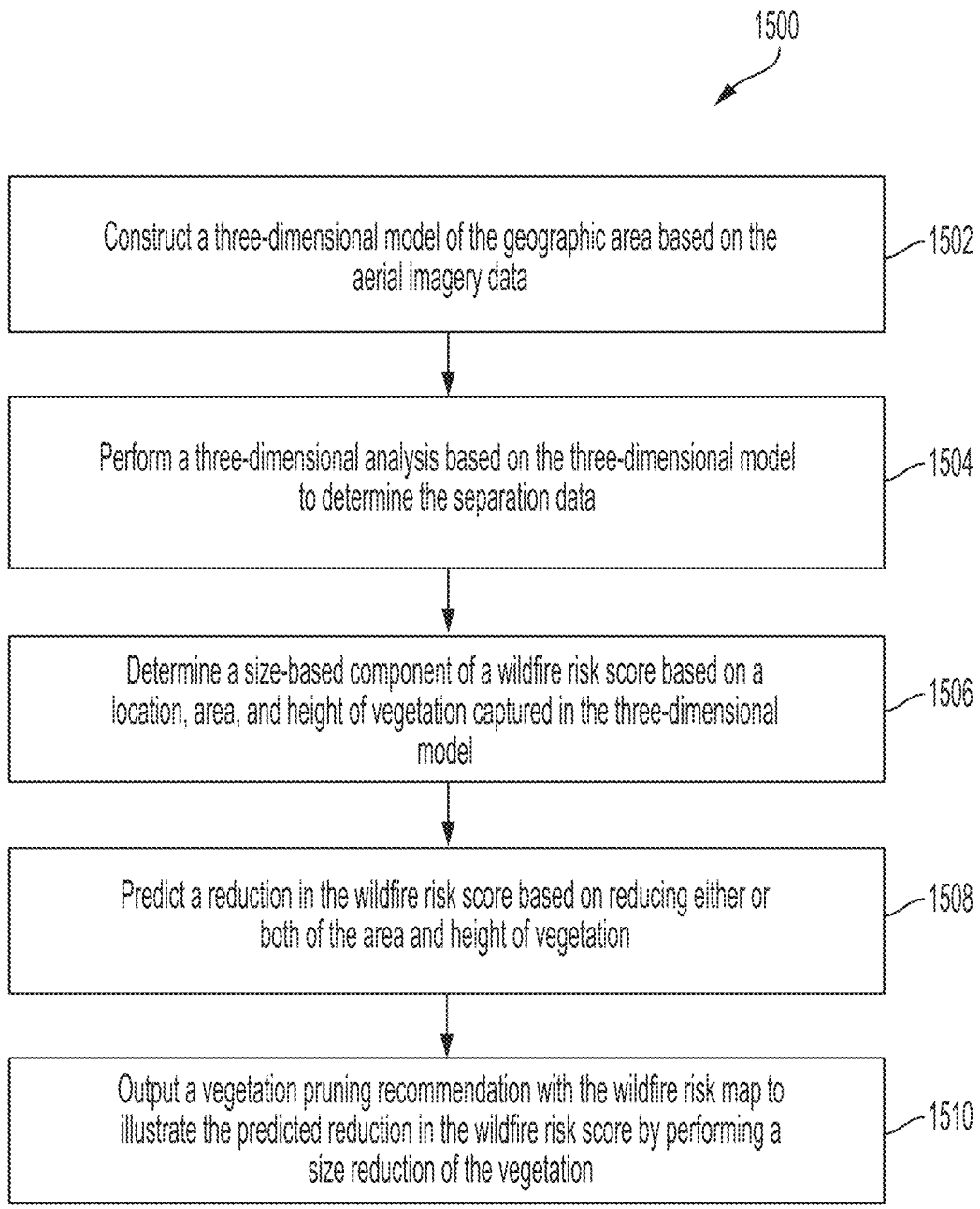
FIG. 15 depicts a process flow according to some embodiments of the present invention.
Figure 16:
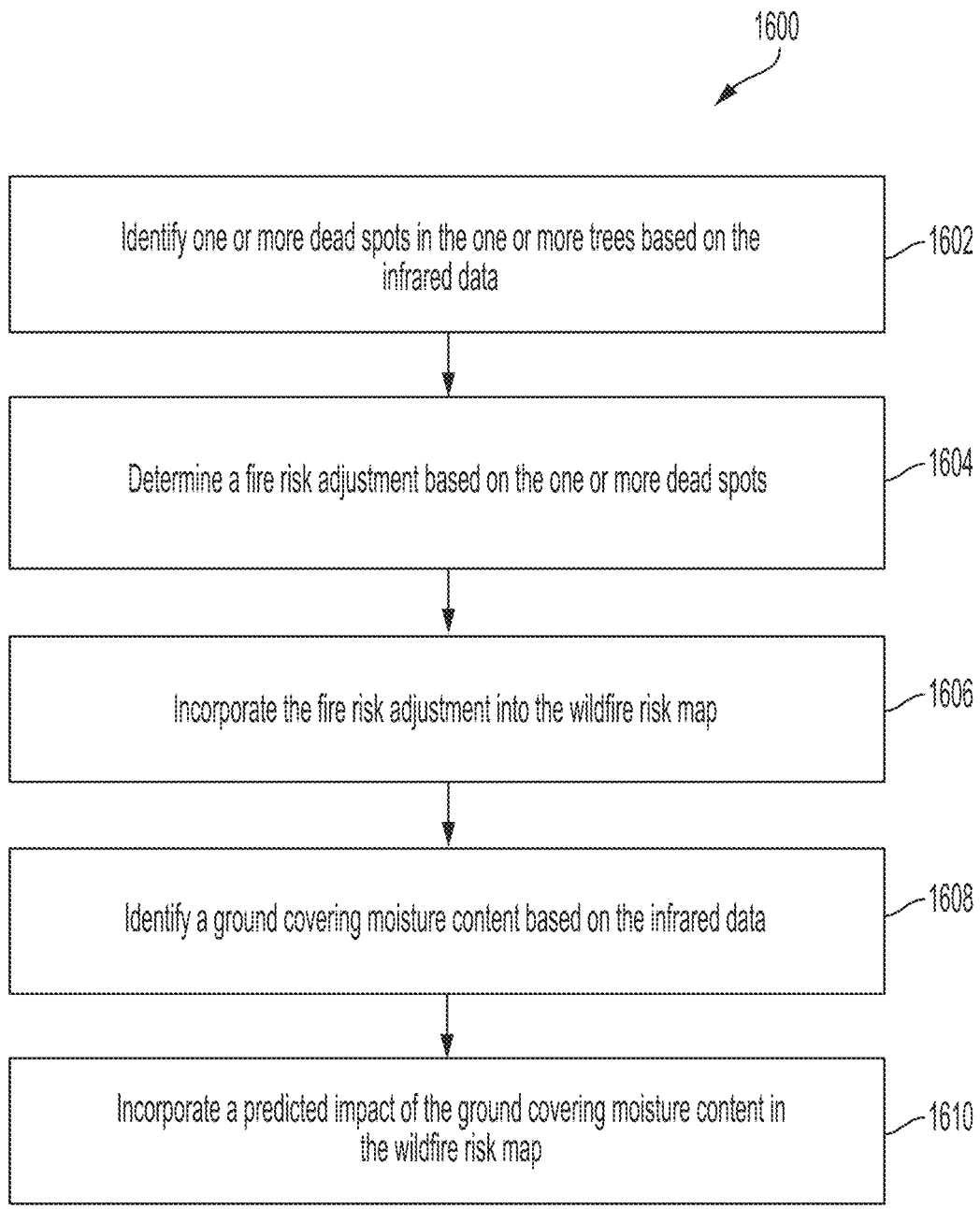
FIG. 16 depicts a process flow according to some embodiments of the present invention.
Figure 17:
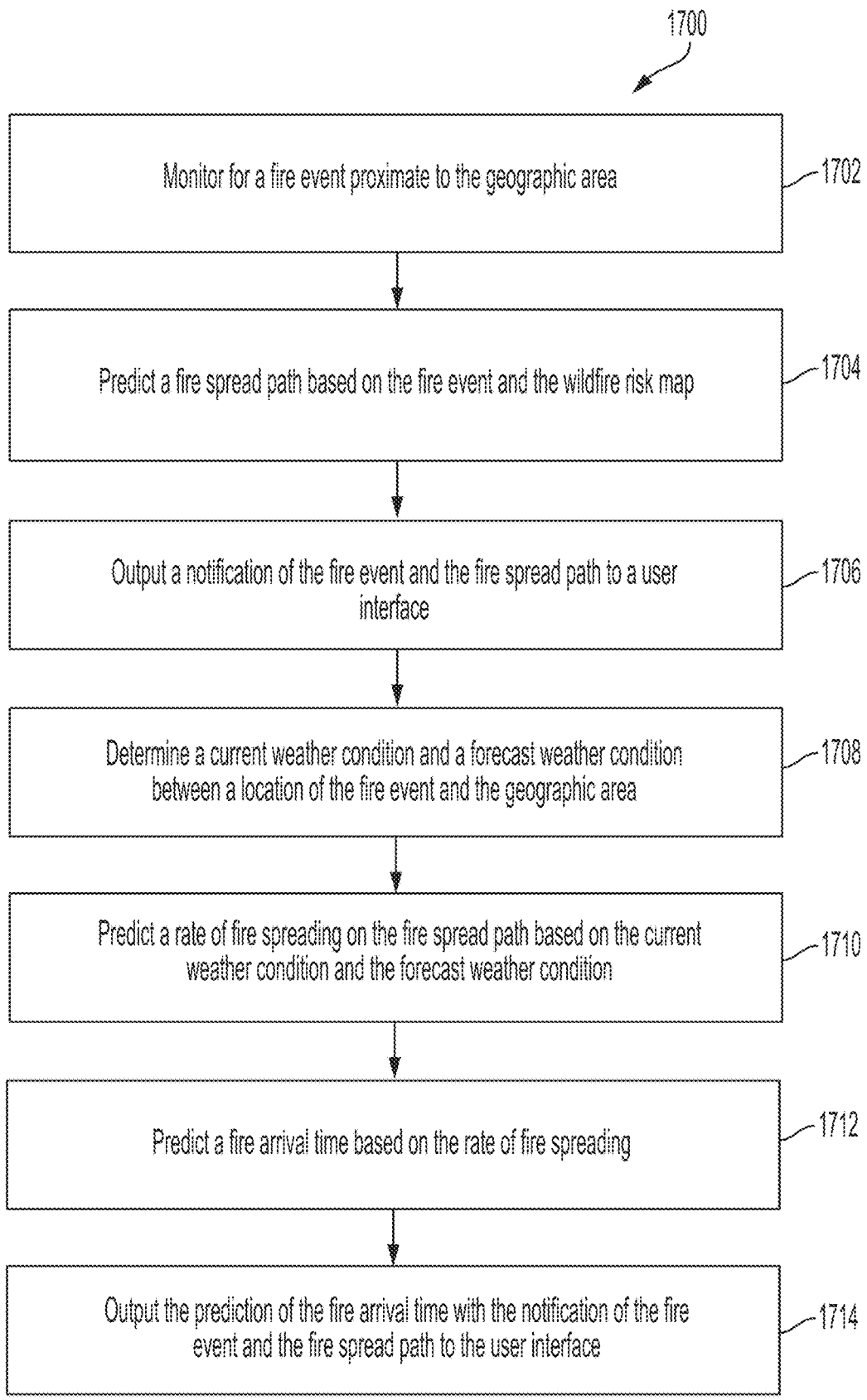
FIG. 17 depicts a process flow according to some embodiments of the present invention.

Turning now to FIGS. 13A and 13B, a process flow 1300 is depicted according to an embodiment. The process flow 1300 includes a number of steps that may be performed in the depicted sequence or in an alternate sequence. The process flow 1300 may be performed by the system 100 of FIG. 1. In one embodiment, the process flow 1300 is performed by the data processing server 102 of FIG. 1 in combination with the one or more user systems 106 and/or the one or more data storage servers 110. The process flow 1300 is described in reference to FIGS. 1-13B.

At step 1302, the data processing server 102 can access a first dataset including aerial imagery data 119 associated with a geographic area. The first dataset can also include infrared data associated with the geographic area. At step 1304, the data processing server 102 can access a second dataset including property boundary data associated with the geographic area. The aerial imagery data 119 can be accessed through one or more third-party services 118 or from a local copy of datasets 122 in a data cache 120. The property boundary data can be accessed from property data 121 through one or more third-party services 118 or from a local copy of datasets 122 in a data cache 120. Where multiple viewing perspectives are used, the aerial imagery data 119 associated with the geographic area from the first viewing perspective and the second viewing perspective can be aligned based on one or more grid patterns 300, 400.

At step 1306, the data processing server 102 can identify a plurality of property boundaries 802, 1106 associated with the geographic area based on the property boundary data. At step 1308, the data processing server 102 can apply a building detection model 710 to identify a building (for instance, as a building footprint 804) based on the first dataset and constrained by the property boundaries 802, 1106. The building detection model 710 can include an artificial intelligence model that predicts a roof location of the building based on individual pixel data and an aggregation of the individual pixel data, for example, to establish the building footprint 804. The property boundaries 802, 1106 can be defined as irregular polygons and can include partial boundaries when mapped to the geographic location covered by the datasets. Coordinate transformations or other map adjustment techniques can be used to establish spatial alignment between the property boundaries 802, 1106 and property features with respect to the datasets.

At step 1310, the data processing server 102 can apply a vegetation detection model 712 to identify one or more vegetation areas (such as trees 806 or other plant life) based on the first dataset and constrained by the property boundaries 802, 1106. A moisture content of the one or more vegetation areas can be identified by the vegetation detection model 712 based on the infrared data of the first dataset in combination with classifying vegetation type of the one or more vegetation areas. Reflectance changes over time can be used to characterize changes in moisture content of vegetation in the infrared band, for example. At step 1312, the data processing server 102 can determine an estimated distance between each of the one or more vegetation areas (such as trees 806 or other plant life) and the building (for instance, a nearest portion of the building footprint 804 or a targeted building feature) as separation data, such as separation data 725. The separation data 725 may include a plurality of distance estimates between various features. For instance, the data processing server 102 can identify one or more neighboring tree pairs 807 based on a location of each of the one or more trees 806, determine an estimated tree-to-tree distance for the one or more neighboring tree pairs 807, and incorporate the estimated tree-to-tree distance into the separation data 725. At step 1314, the data processing server 102 can compare the separation data 725 to a defensible space guideline 726 to determine a defensible space adherence score 728, for instance, as part of result postprocessing 724. The data processing server 102 can also determine a fire risk adjustment based on the moisture content. At step 1316, the data processing server 102 can generate a wildfire risk map 800, including the defensible space adherence score 808A-808D associated with the geographic area, which can be constrained by the property boundaries 802, 1106. The wildfire risk map 800 can incorporate the fire risk adjustment. The data processing server 102 may also receive an update to the first dataset, compare the update to the first dataset with a previous version of the first dataset (e.g., stored in datasets 122), identify one or more changes between the previous version of the first dataset and the update to the first dataset, and modify the wildfire risk map 800 based on the one or more changes.

The data processing server 102 can also create a record including an indicator of the geographic area, the property 805A-805D, and the defensible space adherence score 808A-808D. The record can be held temporarily in the data cache 120 and/or may be captured for longer term retention in the data storage 134. The data processing server 102 can generate a processing request based on the record. The processing request can include, for example, population of one or more electronic forms in a second system, such as the rate-quote-issue system 1210, based on the record. Further, the processing request can include a scoring computation based on comparing contents of the record to one or more scoring thresholds, forwarding a result of the scoring computation with the record for a quote, and sending the quote to a user identifier associated with the property 805A-805D, for instance, as part of process 1200.

The process flow 1300 can be performed responsive to user requests through one or more user applications 132. The data processing server 102 and/or one or more user systems 106 can provide an interactive interface through a graphical user interface, such as user interface 1100. The interactive user interface can highlight the building footprint 804 and/or other features on the graphical user interface 1102. The geographic area can also be identified on the interactive interface based on a user input at the graphical user interface 1102. In some embodiments, the data processing server 102 can perform batch processing for a plurality of properties to create a plurality of records and generate a sequence of processing requests based on the records.

Process flow 1300 can be further enhanced to include one or more steps of processes 1400, 1500, 1600, and/or 1700 of FIGS. 14, 15, 16, and 17. Although processes 1400, 1500, 1600, and 1700 are illustrated as sequential flows, various steps of processes 1400, 1500, 1600, and 1700 can be selectively performed, combined, or omitted in embodiments. Further, steps of processes 1400, 1500, 1600, and 1700 can be incorporated within the process flow 1300 of FIGS. 13A and 13B or performed separately.

In reference to process 1400, at step 1402, the data processing server 102 can identify one or more neighboring properties 805A-805D that share at least one of the property boundaries 802, 1106. At step 1404, the data processing server 102 can perform a cross-property separation analysis with respect to the one or more neighboring properties 805A-805D. The cross-property separation analysis can include determining a shortest distance between the building footprint 804 and a structure on the one or more neighboring properties 805A-805D, such as a building, a garage, a shed, a deck, and the like. The cross-property separation analysis can include determining a shortest distance between the building footprint 804 and one or more trees 806 on the one or more neighboring properties 805A-805D. The cross-property separation analysis may include determining an estimated tree-to-tree distance with respect to the one or more trees 806 on the one or more neighboring properties 805A-805D. At step 1406, the data processing server 102 can incorporate a result of the cross-property separation analysis into the separation data 725.

At step 1408, the data processing server 102 can access a third dataset including a plurality of geographic features 900 associated with the geographic area, which may be accessed from one or more maps 123 through third-party services 118. The geographic features 900 can include, for example, one or more of: an elevation 904, a body of water 906, and a type of ground covering 908. At step 1410, the data processing server 102 can predict a fire path spread pattern 810, 902 between the one or more neighboring properties 805A-805D based on the geographic features 900 identified in the third dataset. For instance, a chain of properties 805A-805D having defensible space adherence scores indicative of a greater wildfire risk can be used to establish a higher likelihood of a path for a wildfire 901 to spread. Further, factors, such as a higher density of vegetation, type of ground covering 908, changes in elevation 904, and obstacles that impede fire spreading, such as bodies of water 906 can impact the projected direction and rate of spreading predicted for a wildfire 901. Known fire path spreading pattern determination algorithms can also be incorporated into the analysis to enhance prediction accuracy.

In reference to process 1500, at step 1502, the data processing server 102 can construct a three-dimensional model 500, 720 of the geographic area based on the aerial imagery data 119. The three-dimensional model 500, 720 can be created or updated as part of data preprocessing 714. At step 1504, the data processing server 102 can perform a three-dimensional analysis based on the three-dimensional model 500, 720 to determine the separation data 725. The three-dimensional analysis can be performed as part of the result postprocessing 724. As an example, the dataset selected for analysis (e.g., a first dataset) can include a plurality of height data on a per-pixel basis. At step 1506, the data processing server 102 can determine a size-based component of a wildfire risk score based on a location, area, and height of vegetation 408 captured in the three-dimensional model 500, 720. At step 1508, the data processing server 102 can predict a reduction in the wildfire risk score based on reducing either or both of the area and height of vegetation 408. For instance, reducing a tree canopy size of one or more trees 806 in close proximity to a building footprint 804A-804D of a building 402 or house 406 may result in an anticipated reduction in the wildfire score for the associated property 805A-805D. At step 1510, the data processing server 102 can output a vegetation pruning recommendation with the wildfire risk map 800 to illustrate the predicted reduction in the wildfire risk score by performing a size reduction of the vegetation 408, for instance on the remote user interface 1000 or user interface 1100. Where portions of the vegetation 408 are identified as dead, dying, or low on moisture content, the impact of pruning recommendations can be more substantial. In some embodiments, subsequent images can be captured for the same location at a later time to determine whether the recommendations were followed and if the wildfire risk score changed.

In reference to process 1600, at step 1602, the data processing server 102 can identify one or more dead spots 510 in the one or more trees 806 or other vegetation based on the infrared data. At step 1604, the data processing server 102 can determine a fire risk adjustment based on the one or more dead spots 510. At step 1606, the data processing server 102 can incorporate the fire risk adjustment into the wildfire risk map 800. At step 1608, the data processing server 102 can identify a ground covering moisture content based on the infrared data. At step 1610, the data processing server 102 can incorporate a predicted impact of the ground covering moisture content in the wildfire risk map 800.

In reference to process 1700, at step 1702, the data processing server 102 can monitor for a fire event proximate to the geographic area. At step 1704, the data processing server 102 can predict a fire spread path based on the fire event and the wildfire risk map 800, such as fire path spread pattern 810, 902 with respect to a wildfire 901. At step 1706, the data processing server 102 can output a notification 1004 of the fire event and the fire spread path to a user interface, such as remote user interface 1000. At step 1708, the data processing server 102 can determine a current weather condition and a forecast weather condition between a location of the fire event and the geographic area, for instance, based on weather data 914. At step 1710, the data processing server 102 can predict a rate of fire spreading on the fire spread path based on the current weather condition and the forecast weather condition. The rate can be impacted by expected precipitation, absence of precipitation, windspeed, wind direction, and the like. At step 1712, the data processing server 102 can predict a fire arrival time 1006 based on the rate of fire spreading. At step 1714, the data processing server 102 can output the prediction of the fire arrival time

1006 with the notification 1004 of the fire event and the fire spread path to the user interface. A recommended course of action 1008 can also be output to the remote user interface 1000.

In some embodiments, the data processing server 102 can access a plurality of datasets from an archive including the aerial imagery data and the infrared data associated with the geographic area and collected over a period of time, for instance, from a third-party service 118 of FIG. 1. The defensible space adherence score and the fire risk adjustment can be determined over the period of time based on the datasets from the archive. One or more areas of change can be identified with respect to landscape management for wildfire defense based on the defensible space adherence score and the fire risk adjustment over the period of time. A future fire risk of the geographic area or a neighboring geographic area can be predicted based on identifying the one or more areas of change and change trends or patterns over the period of time. An alert notification can be triggered based on the future fire risk exceeding an alert threshold. The alert threshold can be established by examining data from previously observed wildfires and/or other information determined to have a causal relationship with fire spread risk. Further aspects can include identifying one or more dead spots in the one or more vegetation areas based on the moisture content and determining the fire risk adjustment based on a distance of the one or more dead spots to a building.

Various property conditions can be used to set or adjust a fire risk. For example, the data processing server 102 can determine a condition of a building, and the fire risk adjustment can be determined based at least in part on the condition of the building. For instance, the condition of the building can be determined based on identifying one or more of: a roof shape of the building, a chimney state of the building, and/or a roof vent of the building. As another example, the building detection model 710 of FIG. 7 can be trained to identify various building configurations, materials, and conditions. For instance, a roofing material of the building can be identified based on the building detection model 710. A roof condition can be detected, such as deterioration or damage to the roofing material, and the fire risk adjustment can be determined based at least in part on the roof condition. As another example, the condition of the building can be determined based on one or more changes over time in the aerial imagery data 119 of FIG. 1 of multiple datasets associated with the building. Further, the condition of the building can be associated with a deck of the building, such as a deck material, a deck deterioration, a deck enclosure, a deck elevation, a deck contents, and other such detectable features.

In some embodiments, the data processing server 102 can identify one or more objects external to a building, for instance, using AI models 126 of FIG. 1. The wildfire risk map 800 can be adjusted based on the one or more objects. For instance, the one or more objects can include at least one fire hydrant or water source. Further, the one or more objects can include at least one fuel storage source. The one or more objects may also include at least one vehicle, such as car 404 of FIG. 4.

In some embodiments, the vegetation detection model 712 can include a three-dimensional model configured to characterize a vegetation size and classify a vegetation type. The vegetation type can be classified as a species, and the species can map to a wildfire risk with respect to the moisture content. Mapping of vegetation species to wildfire risk can be identified through querying one or more data sources, for instance, from third-party services 118 of FIG. 1.

In some embodiments, the AI models 126 of FIG. 1 can be trained to identify a location of an electrical or gas utility connection at a building. The defensible space adherence score can be based on a distance from the location to the one or more vegetation areas. The fire risk can also be adjusted based on detecting a deterioration or other condition in proximity to the location of the electrical or gas utility connection. For instance, where overhead powerlines are used to connect to a building, the presence of trees or other vegetation in proximity to the overhead powerlines can result in an increased fire risk where a possible powerline breakage (e.g., due to tree damage) may result in a live wire contacting vegetation or a combustible object.

Technical effects include automated detection of features in image data that may not be readily observed and understood by a human observer without extensive additional analysis. Automated feature detection and construction of three-dimensional models can enable higher-level analysis functions to derive additional characteristics that may not be apparent in separate datasets. Analysis results can be used to determine compliance with guidelines, a wildfire risk, and predict arrival of a wildfire.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may comprise a computer readable signal medium or a computer readable storage medium. A computer readable storage medium may comprise, for example, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In one aspect, the computer readable storage medium may comprise a tangible medium containing or storing a program for use by or in connection with an instruction execution system, apparatus, and/or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may comprise any computer readable medium that is not a computer readable storage medium and that can communicate, propagate, and/or transport a program for use by or in connection with an instruction execution system, apparatus, and/or device.

The computer readable medium may contain program code embodied thereon, which may be transmitted using any appropriate medium, including, but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server.

It will be appreciated that aspects of the present invention are described herein with reference to flowchart illustrations and/or block diagrams of methods, apparatus (systems) and computer program products, according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

What is claimed is:

1. A system, comprising:
a processing device; and
a memory device in communication with the processing device, the memory device storing instructions that when executed by the processing device result in:
accessing a first dataset comprising aerial imagery data and infrared data associated with a geographic area;
accessing a second dataset comprising property boundary data associated with the geographic area;
identifying a plurality of property boundaries associated with the geographic area;
applying a building detection model to identify a building based on the first dataset and constrained by the property boundaries;
applying a vegetation detection model to identify one or more vegetation areas based on the first dataset and constrained by the property boundaries;
identifying a moisture content of the one or more vegetation areas based on the infrared data;
determining an estimated distance between each of the one or more vegetation areas and the building as separation data;
comparing the separation data to a defensible space guideline to determine a defensible space adherence score;
determining a fire risk adjustment based on the moisture content; and
generating a wildfire risk map comprising the defensible space adherence score associated with the geographic area, wherein the wildfire risk map incorporates the fire risk adjustment.

2. The system of claim 1, further comprising instructions that when executed by the processing device result in:
accessing a plurality of datasets from an archive comprising the aerial imagery data and the infrared data associated with the geographic area and collected over a period of time;
determining the defensible space adherence score and the fire risk adjustment over the period of time based on the datasets from the archive; and
identifying one or more areas of change with respect to landscape management for wildfire defense based on the defensible space adherence score and the fire risk adjustment over the period of time.

3. The system of claim 2, further comprising instructions that when executed by the processing device result in:
predicting a future fire risk of the geographic area or a neighboring geographic area based on identifying the one or more areas of change; and
triggering an alert notification based on the future fire risk exceeding an alert threshold.

4. The system of claim 1, further comprising instructions that when executed by the processing device result in:
   identifying one or more dead spots in the one or more vegetation areas based on the moisture content; and
   determining the fire risk adjustment based on a distance of the one or more dead spots to the building.

5. The system of claim 1, further comprising instructions that when executed by the processing device result in:
   determining a condition of the building; and
   determining the fire risk adjustment based at least in part on the condition of the building.

6. The system of claim 5, wherein the condition of the building is determined based on identifying one or more of: a roof shape of the building, a chimney state of the building, and/or a roof vent of the building.

7. The system of claim 5, further comprising instructions that when executed by the processing device result in:
   identifying a roofing material of the building based on the building detection model;
   detecting a roof condition comprising deterioration or damage to the roofing material; and
   determining the fire risk adjustment based at least in part on the roof condition.

8. The system of claim 5, wherein the condition of the building is determined based on one or more changes over time in the aerial imagery data of multiple datasets associated with the building.

9. The system of claim 5, wherein the condition of the building is associated with a deck of the building.

10. The system of claim 1, further comprising instructions that when executed by the processing device result in:
    identifying one or more objects external to the building; and
    adjusting the wildfire risk map based on the one or more objects.

11. The system of claim 10, wherein the one or more objects comprise at least one fire hydrant or water source.

12. The system of claim 10, wherein the one or more objects comprise at least one fuel storage source.

13. The system of claim 10, wherein the one or more objects comprise at least one vehicle.

14. The system of claim 1, wherein the vegetation detection model comprises a three-dimensional model configured to characterize a vegetation size and classify a vegetation type.

15. The system of claim 14, wherein the vegetation type is classified as a species and the species maps to a wildfire risk with respect to the moisture content.

16. The system of claim 1, further comprising instructions that when executed by the processing device result in:
    identifying a location of an electrical or gas utility connection at the building; and
    determining the defensible space adherence score based on a distance from the location to the one or more vegetation areas.

17. A computer program product comprising a non-transitory storage medium embodied with computer program instructions that when executed by a computer cause the computer to implement:
    accessing a first dataset comprising aerial imagery data and infrared data associated with a geographic area;
    accessing a second dataset comprising property boundary data associated with the geographic area;
    identifying a plurality of property boundaries associated with the geographic area;
    applying a building detection model to identify a building based on the first dataset and constrained by the property boundaries;
    applying a vegetation detection model to identify one or more vegetation areas based on the first dataset and constrained by the property boundaries;
    identifying a moisture content of the one or more vegetation areas based on the infrared data;
    determining an estimated distance between each of the one or more vegetation areas and the building as separation data;
    comparing the separation data to a defensible space guideline to determine a defensible space adherence score;
    determining a fire risk adjustment based on the moisture content; and
    generating a wildfire risk map comprising the defensible space adherence score associated with the geographic area, wherein the wildfire risk map incorporates the fire risk adjustment.

18. The computer program product of claim 17, further comprising computer program instructions that when executed by the computer cause the computer to implement:
    accessing a plurality of datasets from an archive comprising the aerial imagery data and the infrared data associated with the geographic area and collected over a period of time;
    determining the defensible space adherence score and the fire risk adjustment over the period of time based on the datasets from the archive; and
    identifying one or more areas of change with respect to landscape management for wildfire defense based on the defensible space adherence score and the fire risk adjustment over the period of time.

19. The computer program product of claim 18, further comprising computer program instructions that when executed by the computer cause the computer to implement:
    predicting a future fire risk of the geographic area or a neighboring geographic area based on identifying the one or more areas of change; and
    triggering an alert notification based on the future fire risk exceeding an alert threshold.

20. The computer program product of claim 17, further comprising computer program instructions that when executed by the computer cause the computer to implement:
    identifying one or more dead spots in the one or more vegetation areas based on the moisture content; and
    determining the fire risk adjustment based on a distance of the one or more dead spots to the building.

* * * * *